(12) United States Patent
Takeda et al.

(10) Patent No.: US 7,813,619 B2
(45) Date of Patent: Oct. 12, 2010

(54) SYNCHRONIZING OF A DIGITAL SIGNAL USING A PCR PROGRAM CLOCK REFERENCE

(75) Inventors: Hideyuki Takeda, Nagoya (JP); Yuji Nadamoto, Yawata (JP)

(73) Assignee: Panasonic Corporation, Osaka (JP)

( * ) Notice: Subject to any disclaimer, the term of this patent is extended or adjusted under 35 U.S.C. 154(b) by 1281 days.

(21) Appl. No.: 10/567,747

(22) PCT Filed: Sep. 10, 2004

(86) PCT No.: PCT/JP2004/013567

§ 371 (c)(1),
(2), (4) Date: Feb. 10, 2006

(87) PCT Pub. No.: WO2005/034520

PCT Pub. Date: Apr. 14, 2005

(65) Prior Publication Data

US 2006/0262229 A1 Nov. 23, 2006

(30) Foreign Application Priority Data

Oct. 6, 2003 (JP) .............................. 2003-346835

(51) Int. Cl.
*H04N 7/00* (2006.01)
(52) U.S. Cl. .................... 386/95; 386/46; 386/124; 386/98; 348/512
(58) Field of Classification Search .................. 386/46, 386/124, 98, 95
See application file for complete search history.

(56) References Cited

U.S. PATENT DOCUMENTS

| | | | |
|---|---|---|---|
| 5,923,220 A * | 7/1999 | Honma ........................ 331/17 |
| 5,966,387 A * | 10/1999 | Cloutier ....................... 370/516 |
| 6,356,567 B2 | 3/2002 | Anderson et al. | |
| 6,731,658 B1 * | 5/2004 | Inazumi et al. ............. 370/537 |
| 7,230,652 B2 * | 6/2007 | Demas et al. ................ 348/512 |
| 7,315,622 B2 * | 1/2008 | Mani et al. ................... 380/210 |
| 7,702,056 B2 * | 4/2010 | Kaizuka ....................... 375/371 |
| 7,705,652 B2 * | 4/2010 | Jang ............................ 327/299 |
| 2002/0063796 A1 * | 5/2002 | Min ............................. 348/523 |
| 2002/0076196 A1 * | 6/2002 | Nagata et al. .................. 386/46 |
| 2003/0165196 A1 | 9/2003 | Demas et al. | |
| 2004/0055013 A1 * | 3/2004 | Ishioka et al. ................. 725/89 |
| 2004/0165867 A1 * | 8/2004 | Seo et al. ....................... 386/96 |
| 2005/0175322 A1 * | 8/2005 | Demas et al. .................. 386/95 |
| 2005/0259952 A1 * | 11/2005 | Gotoh et al. ................... 386/46 |

FOREIGN PATENT DOCUMENTS

FOREIGN PATENT DOCUMENTS

| JP | 2002-15527 | 1/2002 |
|---|---|---|
| JP | 2003-234935 | 8/2003 |
| JP | 2003-258784 | 9/2003 |

* cited by examiner

*Primary Examiner*—Thai Tran
*Assistant Examiner*—Helen Shibru
(74) *Attorney, Agent, or Firm*—Wenderoth, Lind & Ponack, L.L.P.

(57) ABSTRACT

A digital signal receiving system is provided for establishing high-speed clock resynchronization even if abnormality such as a poor radio wave receiving condition takes place. The system is constructed such that recipient STC data and PCR data are acquired in response to detection of a variation in frequency of a clock signal, and these data are stored as variation information data. The receiver 10 sets the PCR data in the R_STC counter 142, and sends the variation information data to the host device 20. The host device 20, in turn, sets a computation result obtained based on host STC data and the variation information data in the H_STC counter 242.

35 Claims, 15 Drawing Sheets

SYNCHRONIZING OF A DIGITAL SIGNAL USING A PCR PROGRAM CLOCK REFERENCE

TECHNICAL FIELD

The present invention relates to a digital signal receiving system, a digital signal receiving device, a host device, and a semiconductor integrated circuit suitable for receiving digital signals in movable objects.

BACKGROUND ART

In recent years, thanks to the development of digital technology of digitizing various information signals such as video and audio signals, a digital broadcasting system has been put into practical use, as well as the analog TV broadcasting. In such a digital broadcasting system, the MPEG2 system has been employed. In the MPEG2 system, contents data such as digitized video and audio data are packetized into transport stream packets (also called as "TS packets"). The TS packets are multiplexed, and transmitted as transport streams for digital broadcasting. There have been developed TV sets that enable to receive the digital TV broadcasting, as well as the analog TV broadcasting, and receivers dedicatedly used for the digital TV broadcasting called as set top boxes for allowing viewers to watch the digital broadcasting.

In the digital broadcasting system, study has been progressed regarding the terrestrial digital broadcasting. Particularly, in recent years, there is a strong demand in the market for development of movable objects as exemplified by mobile phones. In view of these circumstances, there are being developed mobile terminal devices for use in the terrestrial digital broadcasting.

There are known memory cards such as smart media and secure digital (SD) cards (hereinafter, these devices are sometimes called as "electronic cards") in the production field of movable objects. These memory cards are detachably attachable to mobile phones, digital cameras, or the like. Further, there have been proposed special memory cards constructed such that a radio communication function or a position determining function such as a global positioning system (GPS) is equipped in the ordinary memory card (see Japanese Unexamined Patent Publication No. 2003-234935). Hereinafter, the special memory cards of this type are called as "special memory cards". A component for realizing a special function is incorporated in such a special memory card.

FIG. 17 is an illustration showing an example of a mobile phone as a conventional mobile terminal device. The mobile phone is constructed such that a memory card or a special memory card is detachably attachable. Referring to FIG. 17, the conventional mobile terminal device includes a phone body 90, a key entering portion 92 with which a user is allowed to perform input operations such as entering of telephone numbers, and designation of various operations, a display portion 91 through which the user is notified of information regarding communication or the like, an antenna 93 for transmitting/receiving data, and various processing circuits (not shown) provided in the phone body 90. The mobile phone has an attachment portion 94 in the upper part of the phone body 90 for detachably attaching a memory card. With this arrangement, when the user inserts the memory card into the attachment portion 94, the user is allowed to use the phone body 90 in a manner of combining the mobile phone with the memory card.

For instance, when the user inserts a memory card storing image data into the attachment portion 94, and enters a command indicative of image display through the key entering portion 92, an image corresponding to the designated image data stored in the memory card is displayable on the display portion 91. Further, when the user inserts a special memory card 95 into the attachment portion 94, the user is allowed to use the phone body 90 in a manner of combining the mobile phone with the function of the special memory card. For instance, when the user inserts the special memory card 95 loaded with a GPS function into the attachment portion 94, the location of the mobile phone determined by the GPS is displayable on the display portion 91, and the user is allowed to inform the intended party of the location of the user through the function of the mobile phone. Thus, there has been proposed a system configured such that the function of the host device and the function of the special memory card are combined with each other, with the host device having the function inherent to the mobile phone, and the attachment portion 94 serving as an interface to the special memory card 95.

As the terrestrial digital broadcasting has been put into practical use, it becomes easy to receive the digital broadcasting by way of movable objects. In view of this, there has been a demand in the market for a digital broadcasting receiver or a digital broadcasting receiving system in which such a movable object is usable. Specifically, there is a demand for mobile phones or personal digital assistants (PDAs) through which the digital broadcasting is receivable, car-mounted navigation systems through which the digital broadcasting is receivable, and furthermore for a digital broadcasting receiving system in which a terrestrial digital broadcasting receiver is connected with the mobile phone or the navigation system. In view of these, a need exists in the market for a digital broadcasting receiving system in which a special memory card having a digital broadcasting receiving function, and a mobile terminal device such as a mobile phone functioning as a host device are interconnected with each other, so that users can receive and watch the digital broadcasting.

The following drawbacks should, however, be considered in establishing the digital broadcasting receiving system in which the special memory card having the digital broadcasting receiving function, and the host device are interconnected with each other.

First, since the device such as the movable object is produced on the premise of its portability, it is essential to satisfy the requirements regarding downsizing, light-weighing, and lowering of power consumption.

In addition to the above, there is a greater problem to overcome: in what way clocks in the special memory card and the host device are synchronized with each other. Particularly, there is a strong demand for developing the technology of recovering synchronization of clocks in the special memory card and the host device in a situation that the radio wave receiving condition is degraded such as the startup time of the power of the host device (or the receiver), or that the host device is located in a valley between tall buildings, as well as a situation that the user switches over the channel, or a like situation.

The latter problem will be solved if data including clock information can be transmitted from the special memory card to the host device without delay. However, in most of the cases, the interface of the special memory card as represented by an SD card adopts asynchronous communication. Therefore, the timing at which data is transmitted from the special memory card to the host device (or data is received by the host device) is not constant, namely, varies. In other words, a data transfer time is required until the host device receives data from the special memory card. Consequently, in the case where the user switches over the channel, for example, there is generated delay in time because the clock information sent from the special memory card is received by the host device with a time lag corresponding to the data transfer time. In addition to the above drawback, since the data transfer time is not constant, it is difficult to synchronize the clocks in the special memory card and the host device with each other.

DISCLOSURE OF THE INVENTION

In view of the above problems residing in the prior art, an object of the present invention is to provide a digital signal receiving system constructed such that a digital signal receiving device configured as a special memory card, and a host device are interconnected with each other so as to securely recover synchronization of clocks in the special memory card and the host device, even in a poor radio wave receiving condition, as well as to provide the digital signal receiving device, the host device, and a semiconductor integrated circuit constituting the host device.

To accomplish the above object, according to an aspect of the present invention, provided is a digital signal receiving system comprising: a digital signal receiving device which receives a digital communication signal, has a function of generating a clock signal based on PCR data included in the communication signal, and a function of transmitting a stream signal in the form of a plurality of packets, as well as the clock signal, the stream signal including the communication signal; and a host device which receives the stream signal and the clock signal from the digital signal receiving device via an interface section, the digital signal receiving device including: a recipient STC counter which counts the number of clocks of the clock signal and outputs the counter value as recipient STC data; a variation detector which calculates a difference between the recipient STC data and the PCR data as difference data, and detects a variation in frequency of the clock signal that exceeds a predetermined value based on the difference data; and a variation processor which sends, to the host device, variation information data obtained based on the recipient STC data and the PCR data, and sets the PCR data in the recipient STC counter if the variation detector detects the variation in frequency that exceeds the predetermined value, and the host device including: a host STC counter which counts the number of clocks of the clock signal sent from the digital signal receiving device, and outputs the counter value as host STC data; and an STC correcting unit which calculates correction data based on the host STC data and the variation information data if the variation detector detects the variation in frequency that exceeds the predetermined value, and sets the correction data in the host STC counter so as to coincide the counter value set in the recipient STC counter with the counter value set in the host STC counter.

These and other objects, features, aspects, and advantages of the present invention will become more apparent upon reading of the following detailed description and accompanying drawings.

BEST MODE FOR CARRYING OUT THE INVENTION

Figure 1:
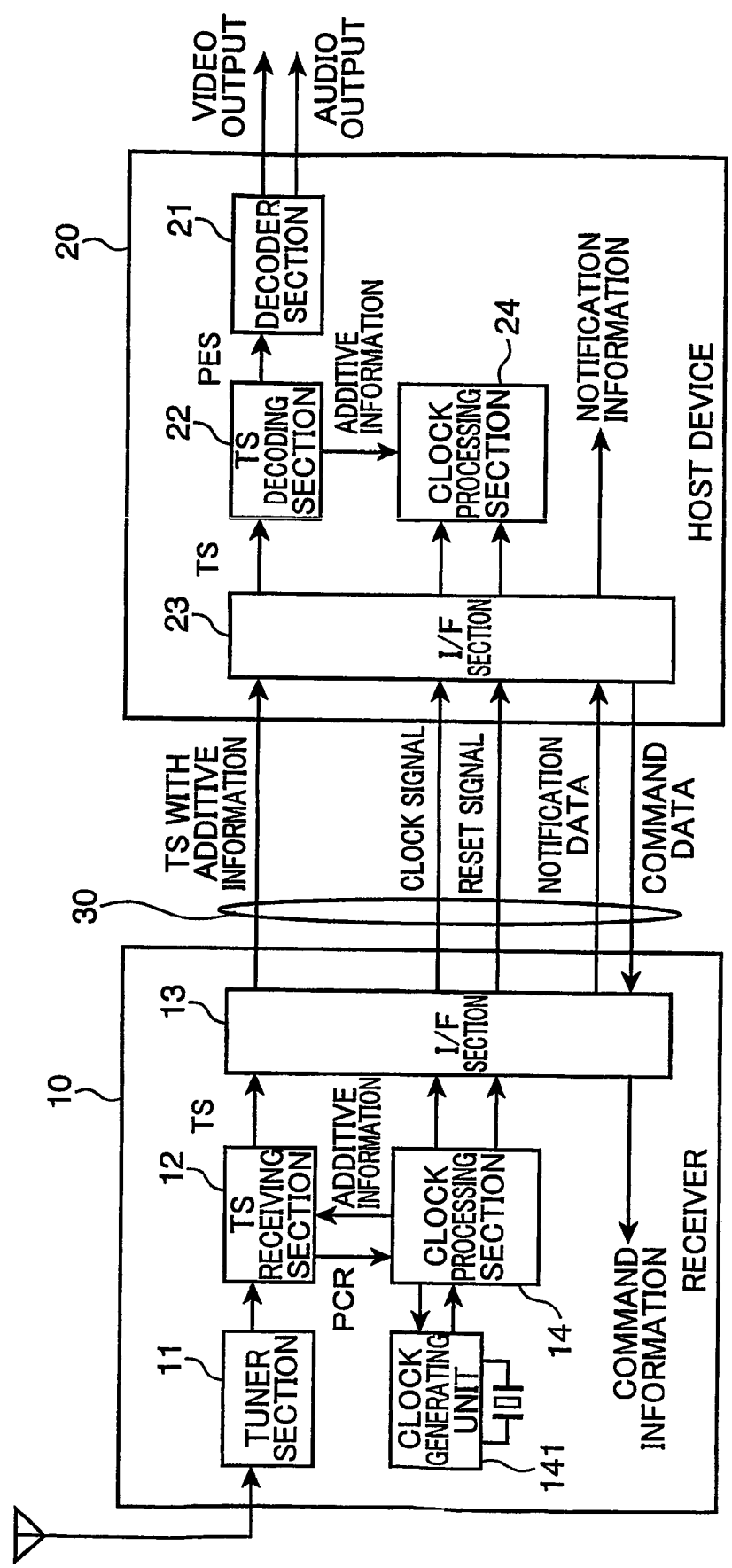
FIG. 1 is a block diagram showing an entire configuration of a digital broadcasting receiving system in accordance with a first embodiment of the present invention.

In the following, preferred embodiments of the present invention are described referring to the drawings. Hereinafter, the embodiments are described by way of examples of the digital broadcasting in digital communication. It should be appreciated that the present invention is not limited thereto.

The MPEG2 system is known as a basic system for allowing a digital broadcasting station (sender) to transmit digital broadcasting to a digital broadcasting receiver (recipient) and allowing the digital broadcasting receiver to receive the digital broadcasting. In this system, the broadcasting station encodes individual materials such as video and audio data independently of each other while keeping the correlation between the respective materials. The encoded individual streams (data strings) are each multiplexed by a multiplexer in accordance with a format of transmission medium suitable for the stream, whereby the stream is transmitted to the receiver. The transmitted multiplexed stream is separated into individual streams such as video streams and audio streams by a separator. These individual streams are sent to decoders, respectively, which, in turn, decode the streams such as video streams and audio streams independently of each other. The decoded data are outputted to an output device such as a monitor and a speaker.

In the MPEG2 system, it is important to accurately send clock information for synchronizing clocks from the sender to the recipient.

In order to accomplish the task, it is necessary to set a reference clock and to synchronize the clocks in the sender and the recipient with each other. In view of this, the broadcasting station (encoder) sends, to the receiver (decoder), PCR (program clock reference) data, which is information for setting and calibrating the value of STC (system time clock) serving as a reference clock to a value intended by the broadcasting station. Upon receiving the PCR data, the receiver generates a clock synchronous with the clock set in the broadcasting station. In this configuration, it is a common practice to correct the clock in the receiver based on a difference between the PCR and the STC regenerated in the receiver.

In addition to the above, it is necessary to synchronize individual streams such as video streams and audio streams with each other in playback of the streams. In view of this, information called as a timestamp is added to each stream. The timestamp indicates at what timing the stream is to be decoded and played back. The timestamp is added with respect to a unit for decoding/playing back the stream (access unit). There are two kinds of timestamps: one is time managing information regarding playback/output, which is called as PTS (presentation timestamp); and the other is time managing information regarding decoding, which is called as DTS (decoding timestamp).

The PTS is designed such that the access unit carrying the PTS is to be played back and outputted when the STC in the receiver coincides with the PTS. On the other hand, the DTS is provided to cope with a situation that the order of playback/output of the video data is to be altered. Namely, the DTS is provided to cope with a situation that the order of decoding and the order of playback/output are differentiated from each other. In view of this, the system is configured such that both of the timestamps (PTS and DTS) are added to the access unit if the PTS is different from the DTS, and that only the PTS is added to the access unit if the PTS and the DTS coincide with each other.

In the following, the preferred embodiments of the present invention are described referring to the drawings by way of examples of the digital broadcasting.

First Embodiment

FIG. 1 is a block diagram showing an entire configuration of the digital broadcasting receiving system in accordance with the first embodiment of the present invention. First, the entire configuration of the digital broadcasting receiving system as the first embodiment is described referring to FIG. 1.

The digital broadcasting receiving system as the first embodiment includes a digital broadcasting receiving device 10 (hereinafter, also called as "receiver 10"), a host device 20, and a digital interface 30 (hereinafter, also called as "digital I/F 30"). The receiver 10 is adapted to receive digital broadcasting, and decode a transport stream signal (hereinafter, also called as "TS" or "transport stream") based on the received signal. The host device 20 is adapted to receive the decoded transport stream from the receiver 10, and decode signals such as video and audio signals based on the received transport stream. The digital interface 30 is adapted to transmit/receive the transport stream and the digital signal between the receiver 10 and the host device 20.

The digital interface 30 is adapted to transfer high-resolution video signals and multi-channel audio signals in a digital format without compressing the signals in a state that the quality thereof is retained. An example of the digital interface 30 is HDMI (high definition multimedia interface), which is an interface designed for digital consumer electronics. The HDMI is an interface designed for audio/visual devices in which the specifications of DVI (digital visual interface) of interfacing a personal computer to a display are modified. The HDMI is free from a drawback residing in the conventional analog cable system, because video signals and audio signals are conveyed by a single cable.

Further, the digital broadcasting receiving system in this embodiment has a feature that a clock signal is supplied along with the transport stream from the receiver 10 to the host device 20 via the digital I/F 30, and that information relating to synchronizing the clock signals in the receiver 10 and the host device 20 are transmitted.

The receiver 10 in this embodiment is an electronic card constructed such that a multi-purpose memory card has a function of receiving digital broadcasting. Use of a mobile terminal device, which is a movable object such as a mobile phone or PDA for use in the digital broadcasting receiving system, as the host device 20 is advantageous in providing the effects and operations of the present invention.

An example of the electronic card is an SD card. The SD card is a flash memory card having a sophisticated copyright protecting function with the size of a postage stamp. The SD card is an electronic card of a large capacity suitable for recording images in a digital camera, moving pictures, music, and the like.

The receiver 10 is constructed such that a tuner section 11 applies processing such as demodulation and error correction to a digital broadcasting wave received by an antenna for outputting a demodulated signal. The demodulated signal from the tuner section 11 is transmitted to a transport stream receiving section 12 (hereinafter, also called as "TS receiving section 12").

The TS receiving section 12 receives the demodulated signal from the tuner section 11, and restores the transport stream based on the demodulated signal. The transport stream is constituted of a certain number of transport stream packets (hereinafter, sometimes called as "TS packets") obtained by packetizing contents data such as video and audio data of digital broadcasting programs. The TS receiving section 12 detects each of the TS packets constituting the transport stream, and extracts information especially necessary for synchronization or the like. Each TS packet is constituted of a header section for storing management data relating to the TS packet, and a data section for storing contents data of the programs, information relating to the programs, and the like.

The header section includes sink byte indicative of a leading end of the TS packet, and packet identification information (hereinafter, also called as "PID information"), which is the identification number of the TS packet. The TS receiving section 12 identifies the TS packet by detecting the sink byte indicative of the leading end of the TS packet. The TS receiving section 12 extracts the TS packet containing information relating to the PCR, which is necessary for regenerating the clock, with use of the PID information. The PCR information is information relating to the clock in the broadcasting station of the digital broadcasting. Upon extracting the TS packet containing the PCR information, the TS receiving section 12 notifies a clock processing section 14 of the PCR information stored in the data section of the TS packet. The TS receiving section 12 supplies the decoded transport stream to an interface section 13 (also, referred to as "I/F section 13").

A clock generating unit 141 generates a clock signal necessary for digital processing in the receiver 10.

The clock processing section 14 receives the PCR information from the TS receiving section 12, and regenerates (i.e., reproduces) a clock synchronous with the clock in the broadcasting station in cooperation with the clock generating unit 141 with use of the PCR information. The clock signal regenerated in the clock processing section 14 is sent to the I/F section 13.

Further, the clock processing section 14 detects synchronization failure when synchronization is not established in clock regeneration due to a poor radio wave receiving condition. Also, the clock processing section 14 notifies the TS receiving section 12 of additive information including variation information data. The variation information data is information relating to a clock regenerating condition when synchronization is not established. Upon receiving the additive information including the variation information data, the TS receiving section 12 generates additive data storing the additive information. The TS receiving section 12 attaches the additive data to the decoded transport stream, and supplies the transport stream along with the additive data to the I/F section 13. The process as to how synchronization failure is detected, and details of the additive information will be described later.

The additive data may be attached to a data section of an additive packet, in place of being attached to the transport stream. Further alternatively, the additive data may be attached in between the successively transmitted packets without being packetized and without being stored in an additive packet. Further alternatively, the additive data may be transmitted in parallel with packet transmission immediately after the synchronization failure is detected.

The I/F section 13 is an interface provided in the receiver 10 for implementing communication with the host device 20, transmitting a clock signal or the like. The I/F section 13 functions as a recipient interface. The receiver 10 sends the regenerated clock signal and a reset signal along with the transport stream including the additive information to the host device 20 via the I/F section 13. The I/F section 13 sends, to the host device 20, notification data of notifying statuses of the respective processing in the receiver 10. The host device 20 sends, to the I/F section 13, command data for controlling the receiver 10. In response to receiving the command data, the I/F section 13 notifies the respective parts in the receiver 10 of command information for designating the processing or the like, depending on the contents of the command data.

An I/F section 23 is an interface provided in the host device 20 for implementing communication with the receiver 10 and for receiving the clock signal or the like. The I/F section 23 functions as a host interface. The host device 20 receives the clock signal and the reset signal along with the transport stream including the additive information from the receiver 10 via the I/F section 23. Further, the host device 20 receives, from the receiver 10, the notification data including the information relating to the statuses of the respective processing in the receiver 10. The I/F section 23 sends, to the receiver 10, command data for allowing the host device 20 to control the receiver 10. The I/F section 23 notifies the respective parts in the host device 20 of the contents of the notification data as notification information.

A TS decoding section 22 separates the transport stream supplied to the I/F section 23 into video packets containing video data, audio packets containing audio data, and information data packets containing information relating to data receiving and the like for outputting. At this time, the TS decoding section 22 supplies, to a decoder section 21, the packets containing contents data of the respective programs such as video packets and audio packets as a packetized elementary stream called PES. The PES is constituted of the packets containing the contents data.

The decoder section 21 receives the PES constituted of the video packets and audio packets supplied from the TS decoding section 22. The decoder section 21 extracts the video data and the audio data stored in the data section of each packet, and decodes the respective video signals and the audio signals for outputting to the monitor and the speaker.

A clock processing section 24 receives the clock signal sent from the receiver 10, and generates a clock signal in the host device 20 based on the received clock signal. The clock processing section 24 resets a counter or the like provided in the clock processing section 24 in response to receiving a reset signal from the receiver 10.

The TS decoding section 22 extracts the additive data from the transport stream that has been sent to the I/F section 23, and supplies the extracted additive data to the clock processing section 24. The clock processing section 24 extracts the variation information data from the supplied additive data. The clock processing section 24 updates the counter value of the counter provided in the clock processing section 24 based on the variation information data, and resumes the counting from the updated counter value.

As described above, the digital broadcasting receiving system in this embodiment is configured such that the receiver 10 and the host device 20 are interconnected with each other via the digital I/F 30. In this embodiment, the transport stream carrying the additive information, the clock signal, the reset signal, the notification data, and the command data is transmitted between the receiver 10 and the host device 20 via the digital I/F 30.

Figure 2:
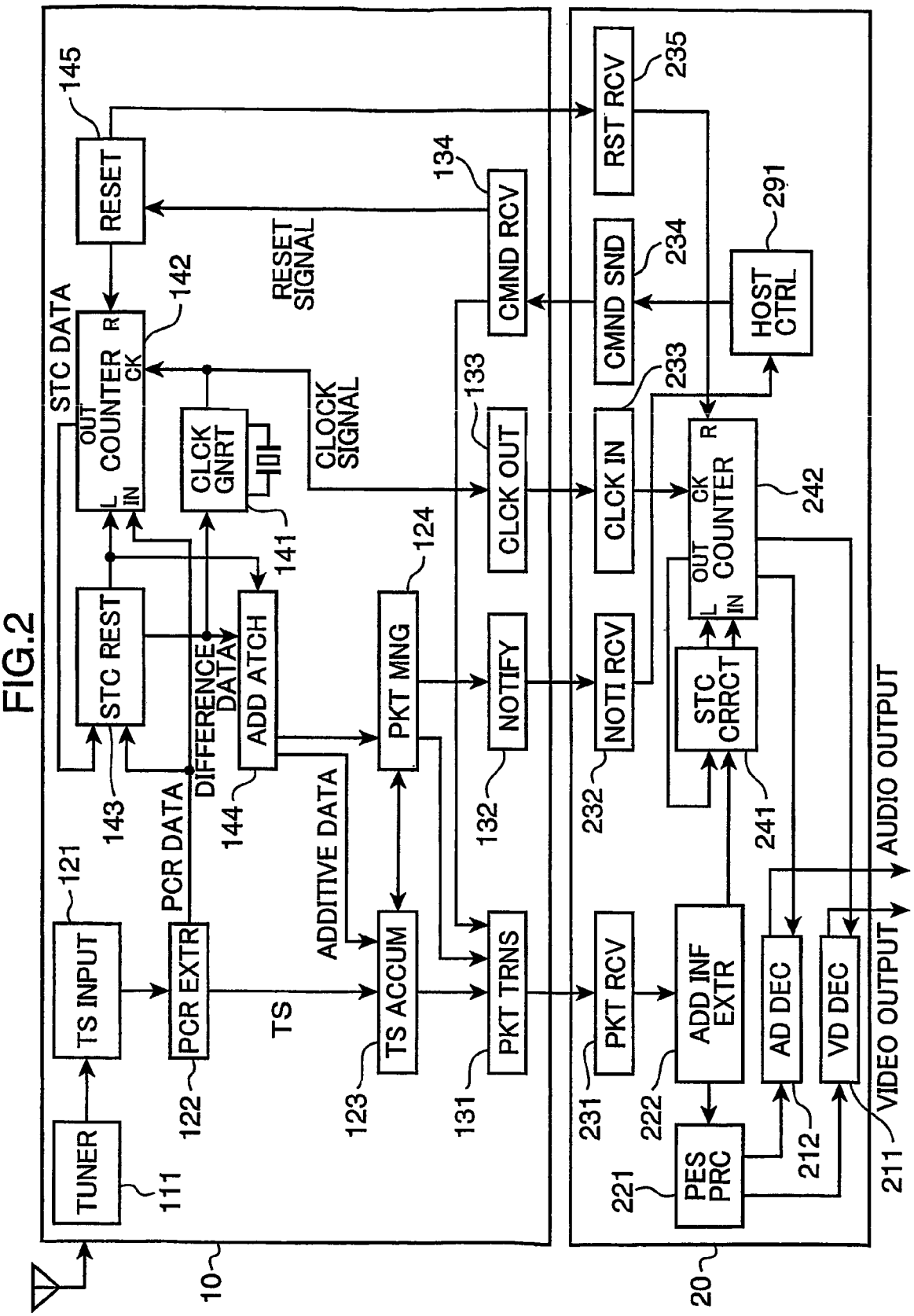
FIG. 2 is a block diagram showing a detailed configuration of the digital broadcasting receiving system in accordance with the first embodiment of the present invention.

Next, the configurations of the digital broadcasting receiving device 10 and the host device 20 in the digital broadcasting system in accordance with the first embodiment of the present invention are described in detail referring to the block diagram of FIG. 2.

First, the detailed configuration of the receiver 10 is described. The tuner section 11 in FIG. 1 is constituted of a tuner unit 111 shown in FIG. 2. The TS receiving section 12 in FIG. 1 is constituted of a TS inputting unit 121, a PCR extracting unit 122, a TS accumulating unit 123, and a packet managing unit 124 shown in FIG. 2. The I/F section 13 shown in FIG. 1 is constituted of a packet transferring unit 131, a notification unit 132, a clock outputting unit 133, and a command receiving unit 134 shown in FIG. 2. The clock processing section 14 shown in FIG. 1 is constituted of an R_STC counter 142, an STC recovering unit 143, an additive information attaching unit 144, and a reset processing unit 145 shown in FIG. 2.

Referring to FIG. 2, the tuner unit 111 is adapted to apply processing such as demodulation and error correction to a digital broadcasting wave received by the antenna, and to output the demodulated signal to the TS inputting unit 121.

Upon receiving the demodulated signal from the tuner unit 111, the TS inputting section 121 decodes the transport stream based on the demodulated signal. The decoded transport stream is supplied from the TS inputting unit 121 to the PCR extracting unit 122.

The PCR extracting unit 122 detects the PID information of each TS packet in the supplied transport stream, and extracts the TS packet containing the PCR information based on the PID information. Further, the PCR extracting unit 122 extracts the PCR information stored in the extracted TS packet, and notifies each of the STC recovering unit 143 and the R_STC counter 142 of the extracted PCR information as PCR data. Further, the PCR extracting unit 122 supplies, to the TS accumulating unit 123, the transport stream that has been supplied from the TS inputting unit 121.

The TS accumulating unit 123 is a packet buffer which temporarily and accumulatively stores a predetermined number of TS packets included in the transport stream. The TS accumulating unit 123 successively stores the TS packets supplied from the PCR extracting unit 122 in accordance with a command sent from the packet managing unit 124. Further, in response to receiving a command of attaching the additive information from the packet managing unit 124, the TS accumulating unit 123 stores the additive data including the additive information supplied from the additive information attaching unit 144 along with the TS packet. The transport stream constituted of the TS packets and the additive data is supplied from the TS accumulating unit 123 to the packet transferring unit 131.

Then, the packet transferring unit 131 sends, to the host device 20, the transport stream along with the additive information in response to a packet readout command, which is one of the command information sent from the command receiving unit 134.

The clock generating unit 141 generates a clock signal necessary for digital processing in the receiver 10. At this time, the clock generating unit 141 generates a clock signal of a frequency corresponding to a difference data sent from the STC recovering unit 143. The clock generating unit 141 converts the difference data into a control voltage by a digital-to-analog (D/A) converter or by combination of a pulse width modulator (PWM) and a low pass filter. Further, the clock generating unit 141 controls the oscillation frequency of a voltage-controllable crystal oscillator based on the control voltage, and via a loop filter or a like device, if necessary. The clock generating unit 141 outputs the signal outputted from the voltage-controllable crystal oscillator as a clock signal via a buffer or a like device, if necessary. Thus, the clock generating unit 141 generates the clock signal depending on the difference data for transmitting the clock signal to the respective parts in the receiver 10.

The R_STC counter 142 is a counter for generating a system time clock (hereinafter, also called as "STC") used for generating a reference clock. The R_STC counter 142 functions as a recipient STC counter. The R_STC counter 142 implements counting by counting the clock signal which is outputted successively from the clock generating unit 141 through a clock input terminal (CK). The R_STC counter 142 outputs count data indicative of the number of counting the clock signal to a count output terminal (OUT), as recipient STC data, for supplying the recipient STC data to the STC recovering unit 143. The R_STC counter 142 has a reset input terminal (R), a load input terminal (L), and a load data input terminal (IN).

The R_STC counter 142 is notified of the reset signal from the reset processing unit 145 through the reset input terminal. Upon receiving the reset signal, the R_STC counter 142 sets the count data outputted from the count output terminal to an initial value such as zero.

Upon receiving a variation detection signal, which will be described later, from the STC recovering unit 143 through the load input terminal, the R_STC counter 142 reads out the PCR data from the PCR extracting unit 122. Thus, the R_STC counter 142 receives the PCR data through the load data input terminal. The R_STC counter 142 sets the count data outputted from the count output terminal to the value of the readout PCR data.

The STC recovering unit 143 reads out the recipient STC data from the R_STC counter, and the PCR data from the PCR extracting unit 122. Then, the STC recovering unit 143 computes a difference between the recipient STC data and the PCR data, and sets the difference as difference data. Further, the STC recovering unit 143 detects synchronization failure or abnormality in clock regeneration by utilizing the difference data.

Figure 3:
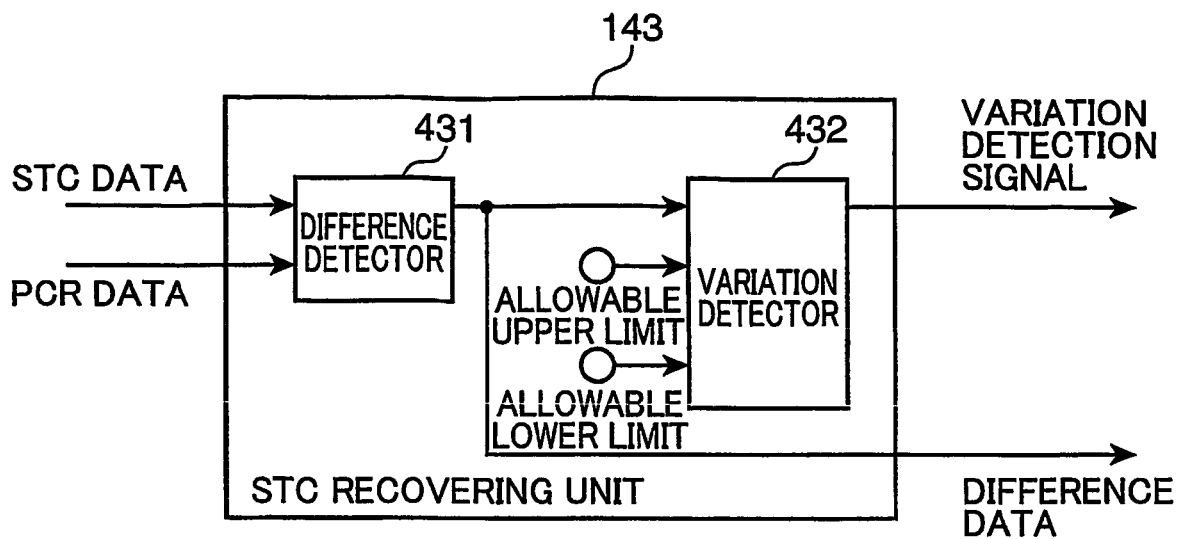
FIG. 3 is a block diagram showing a detailed configuration of an STC recovering unit in the digital broadcasting receiving system in accordance with the first embodiment of the present invention.

FIG. 3 is a block diagram showing details of the STC recovering unit 143. Referring to FIG. 3, a difference detector 431 of the STC restoring unit 143 calculates a difference between the recipient STC data and the PCR data, and supplies the difference as difference data to a variation detector 432 and the clock generating unit 141. The variation detector 432 reads out the difference data sent from the difference detector 431, as well as predetermined upper allowable limit and lower allowable limit with respect to the difference data. The variation detector 432 outputs a variation detection signal in the case where a variation in frequency larger than a predetermined value is detected based on the difference data, namely, if the difference data is out of the range defined by the upper limit and the lower limit. Specifically, the variation detector 432 monitors a variation corresponding to the difference between the recipient STC data and the PCR data, and judges that synchronization failure or abnormality has taken place in clock regeneration if the difference data is above the upper limit or below the lower limit.

If the variation detector 432 judges that synchronization failure or abnormality has occurred in clock regeneration, the variation detector 432 notifies the load input terminal of the R_STC counter 142 of the variation detection signal indicative of detection of synchronization failure.

The variation detector 432 may monitor the absolute value of the difference data, and output a variation detection signal if the absolute value of the difference data exceeds the allowable upper limit.

In response to detection of a variation in frequency by the variation detector 432, the STC recovering unit 143 reads out the recipient STC data and the PCR data, stores these data as variation information data, and sets the PCR data in the R_STC counter 142. Thus, the STC recovering unit 143 also functions as a variation processor.

In this way, the clock generating unit 141, the R_STC counter 142, and the STC recovering unit 143 establish a clock regenerating loop for generating a clock signal synchronous with the reference clock set in the broadcasting station based on the PCR data sent from the PCR extracting unit 122. Thus, upon receiving the PCR data from the PCR extracting unit 122, the difference detector 431 of the STC restoring unit 143 calculates a difference between the recipient STC data and the PCR data.

In the case where the value of the PCR data is larger than the value of the recipient STC data, for example, a control voltage of a value corresponding to the difference data is applied to the voltage-controllable crystal oscillator. Thereby, the frequency of the clock signal generated in the clock generating unit 141 is increased, and accordingly, the counting rate of the R_STC counter 142 is increased. As a result, the value of the recipient STC data is closer to the value of the PCR data, and finally identical thereto. Implementing the loop control as mentioned above each time the PCR data is extracted by the PCR extracting unit 122 makes it possible to lock the clock generating loop in such a manner that the value of the PCR data and the value of the recipient STC data are coincident with each other. Thus, the clock signal generated in the clock generating unit 141 is synchronized with the reference clock in the broadcasting station. In the digital broadcasting system, generally, 27 MHz is used as the frequency of the clock signal.

Further, as mentioned above, the variation detector 432 of the STC recovering unit 143 notifies the R_STC counter 142 of the variation detection signal if the variation detector 432 judges that the value of the difference data is out of the range defined by the allowable upper limit and the allowable lower limit. Setting the value of the PCR data in the R_STC counter 142 based on the variation detection signal contributes to expediting the time required from unlocking (state where the value of the recipient STC data is deviated from the value of the PCR data) to locking (state where the value of the recipient STC data is coincident with the value of PCR data) of the clock regenerating loop.

Specifically, if the variation detector 432 detects that the difference data is out of the allowable range thereof, such detection means that the value of the recipient STC data and the value of the PCR data greatly differ from each other. In such a case, a certain time is required to lock the clock regenerating loop if an attempt is made to coincide the value of the recipient STC data with the value of the PCR data merely with use of the clock regenerating loop. In this embodiment, if the value of the PCR data is greatly deviated from the value of the recipient STC data, the value of the PCR data is set in the R_STC counter 142, and the R_STC counter 142 resumes counting the clock signal from the value of the PCR data. This arrangement makes it possible to shorten the time required from unlocking to locking of the clock regenerating loop.

The variation detection signal and the difference data outputted from the STC recovering unit 143 are also transmitted to the additive information attaching unit 144. Further, the difference data is attached to the transport stream as the additive information to be supplied to the host device 20.

In this embodiment, described is the case that the difference data relating to synchronization failure or abnormality in clock regeneration is utilized as the variation information data. The present invention is not limited thereto. The variation information data may be the recipient STC data and the PCR data at the time of detecting a variation in frequency of the clock signal. The details of the alteration will be described later.

As described above, the variation detection signal and the difference data are sent from the STC recovering unit 143 to the additive information attaching unit 144. The additive information attaching unit 144 attaches the supplied difference data as variation information data to the transport stream. The variation information data includes information indicative of the variation in frequency of the clock signal which has been detected by the variation detector 432. The additive information attaching unit 144 generates additive information, which is used in attaching the variation information data (difference data) to the transport stream decoded by the TS inputting unit 121.

The additive information includes the difference data and a valid flag indicating whether the variation detection signal (difference data) is valid or not. In response to receiving the variation detection signal, the additive information attaching unit 144 sets the valid flag to, e.g., "1" indicating that the variation detection signal (difference data) is valid, and generates additive data as the additive information along with the supplied difference data. On the other hand, if the variation detection signal is not detected, the additive information attaching unit 144 generates additive data with the valid flag being set to, e.g., "0" indicating that the variation detection signal (difference data) is invalid. The additive information attaching unit 144 supplies the generated additive data to the TS accumulating unit 123.

The packet managing unit 124 manages each of the TS packets which are supplied from the PCR extracting unit 122 to the TS accumulating unit 123 along with the additive data sent from the additive information attaching unit 144. The packet managing unit 124 controls the TS accumulating unit 123 to attach the additive data to each of the TS packets extracted by the TS extracting unit 122 according to a predetermined format. Further, the packet managing unit 124 checks up whether a certain number of packets to be transferred to the host device 20 have been accumulated in the TS accumulating unit 123. Upon confirming that the packet transfer preparation has been completed, the packet managing unit 124 causes the TS accumulating unit 123 to supply the packets to the packet transferring unit 131.

The clock outputting unit 133 is an interface for transmitting the clock signal generated in the clock generating unit 141 to the host device 20.

The notification unit 132 is an interface for transmitting, to the host device 20, notification data including information relating to the statuses of the respective processing in the receiver 10. For instance, the packet managing unit 124 notifies the notification unit 132 that the packet transfer preparation has been completed. Upon receiving the notification, the notification unit 132 notifies the host device 20 of the completion of the packet transfer preparation. Alternatively, upon receiving a variation detection signal, the packet managing unit 124 may notify the host device 20 of the variation detection via the notification unit 132.

The command receiving unit 134 is an interface for receiving command data which has been transmitted from the host device 20 for controlling the receiver 10. In response to receiving the command data including a reset signal from a host controlling unit 291 of the host device 20, for example, the command receiving unit 134 notifies the reset processing unit 145 of the reset signal. Further, in response to receiving command data requesting packet transfer from the host controlling unit 291 of the host device 20, for example, the command receiving unit 134 notifies the packet transferring unit 131 of a packet transfer signal.

The packet transferring unit 131 is an interface for sending the transport stream including the additive data to the host device 20. In response to receiving the packet transfer signal from the command receiving unit 134, the packet transferring unit 131 transfers the packets which have been accumulated in the TS accumulating unit 123 to the host device 20.

Figure 4:
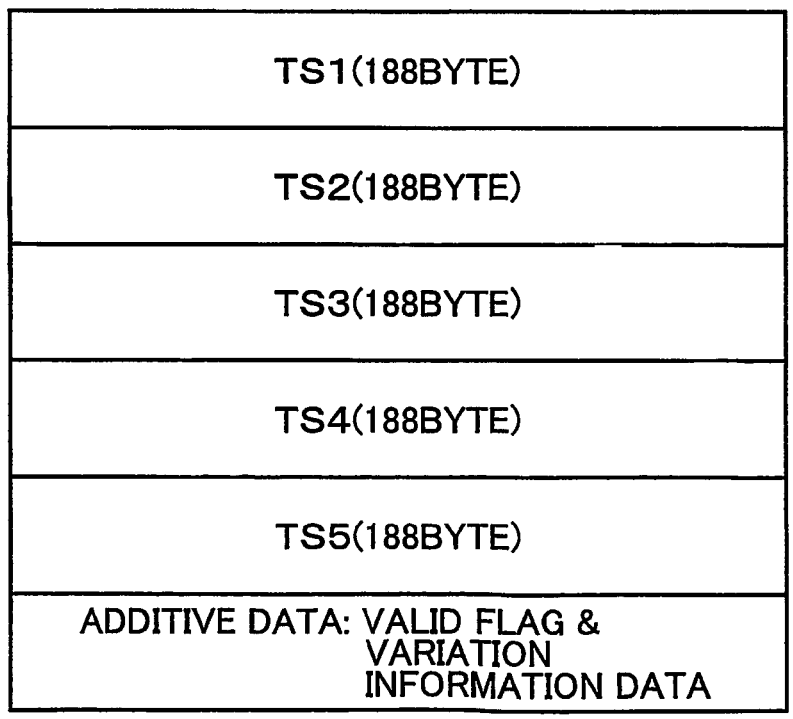
FIG. 4 is an illustration showing an example of a communication format of data to be transferred from a packet transferring unit in the digital broadcasting receiving system in accordance with the first embodiment of the present invention.

FIG. 4 is an illustration showing an example of a communication format of data to be transferred from the packet transferring unit 131. Referring to FIG. 4, TS1 through TS5 each denotes a TS packet decoded by the TS inputting unit 121. In this example, the data is transferred in the form of five TS packets. As mentioned above, in the case where a variation in frequency of the clock signal is detected by the variation detector 432, the additive data generated in the additive information attaching unit 144 is attached to the transport stream. The additive data includes the valid flag indicating whether the variation detection signal (difference data) is valid or not, and the variation information data. The packet transferring unit 131 transfers the transport stream carrying the additive data to the host device 20 bit by bit in accordance with the above defined communication format.

Next, the detailed configuration of the host device 20 shown in FIG. 2 is described. The I/F section 23 shown in FIG. 1 is constituted of a packet receiving unit 231, a notification receiving unit 232, a clock inputting unit 233, a command sending unit 234, and a reset receiving unit 235 shown in FIG. 2. The TS decoding section 22 shown in FIG. 1 is constituted of an additive information extracting unit 222, and a PES processing unit 221 shown in FIG. 2. The clock processing unit 24 shown in FIG. 1 is constituted of an STC correcting unit 241 and an H_STC counter 242 shown in FIG. 2.

The decoder section 21 shown in FIG. 1 is constituted of an audio decoder 212 and a video decoder 211 shown in FIG. 2. The host controlling unit 291 shown in FIG. 2 is a controlling unit which controls the respective parts of the host device 20, and generates and sends command information indicative of commands to the respective parts of the receiver 10.

Referring to FIG. 2, the packet receiving unit 231 is an interface for receiving the transport stream including the additive data from the packet transferring unit 131 of the receiver 10. The packet receiving unit 231 supplies the received transport stream to the additive information extracting unit 222.

The command sending unit 234 is an interface for sending command data which allows the host device 20 to control the receiver 10. In response to receiving the command information from the host controlling unit 291, the command sending unit 234 sends the command data based on the command information to the command receiving unit 134 of the receiver 10. The command sending unit 234 sends, to the command receiving unit 134, the command data indicative of resetting the counter, transferring packets, or the like.

The notification receiving unit 232 is an interface for receiving notification data including information relating to statuses of the respective processing in the receiver 10. The notification receiving unit 232 receives the notification data sent from the notification unit 132 of the receiver 10, and sends the notification data as notification information to the host controlling unit 291. For instance, the notification receiving unit 232 is notified that preparation of TS packet transfer has been completed in the TS accumulating unit 123.

The clock inputting unit 233 is an interface for receiving a clock signal generated in the clock generating unit 141 of the receiver 10. The clock inputting unit 233 receives the clock signal sent from the clock outputting unit 133 of the receiver 10. Upon receiving the clock signal from the clock outputting unit 133, the clock inputting unit 233 sends the clock signal to the clock input terminal of the H_STC counter 242.

The reset receiving unit 235 is an interface for receiving the reset signal sent from the reset processing unit 145 of the receiver 10. In this embodiment, the reset receiving unit 235 is dedicatedly connected with the reset processing unit 145 for receiving the reset signal from the reset processing unit 145. Alternatively, an interrupt connection provided for controlling the communication between the host device 20 and the receiver 10 may be used to receive the reset signal. Further alternatively, an element corresponding to the reset processing unit 145 may be provided in the host device 20, and an element corresponding to the reset receiving unit 235 may be provided in the receiver 10.

The additive information extracting unit 222 extracts the additive data from the transport stream which is supplied from the packet receiving unit 231. The additive information extracting unit 222 supplies the extracted additive data to the STC correcting unit 241. The additive information extracting unit 222 supplies, to the PES processing unit 221, the transport stream supplied from the packet receiving unit 231.

The PES processing unit 221 separates the supplied transport stream into video packets containing video data, audio packets containing audio data, and information data packets containing information relating to data receiving and the like. Subsequently, the PES processing unit 221 isolates the packets containing contents data of the respective programs such as video packets and audio packets to restructure the PES. The PES processing unit 221 supplies the restructured PES to the video decoder 211 and the audio decoder 212. The PES contains the aforementioned timestamps, namely, the PTS (and the DTS).

The additive information extracting unit 222 and the PES processing unit 221 constitute a stream decoding section for decoding the data carried by the transport stream sent from the host interface.

The video decoder 211 extracts the video packets from the supplied PES, decodes the video signals from the video data in the video packets, and outputs the decoded video signals to the monitor or a like device. The audio decoder 212 extracts the audio packets from the supplied PES, decodes the audio signals from the audio data in the audio packets, and outputs the decoded audio signals to the speaker or a like device. The timing of reproducing and outputting the video and audio data is controlled by the aforementioned PTS (and the DTS).

As will be described later, the video decoder 211 and the audio decoder 212 receive STC data from the H_STC counter 242 of the host device 20. The system is configured such that the video and audio data are outputted from the monitor and the speaker, respectively, in the case where the STC data coincides with the PTS.

The STC correcting unit 241 extracts the valid flag and the difference data from the additive data which has been supplied from the additive information extracting unit 222. The STC correcting unit 241 receives counter data, as host STC data from the count output terminal of the H_STC counter 242. In response to receiving the count data, the STC correcting unit 241 implements a certain computation based on the host STC data and the difference data, and sets the computation result as correction data. The STC correcting unit 241 supplies the correction data to a load data input terminal of the H_STC counter 242.

The STC correcting unit 241 checks up the validity of the extracted valid flag. If it is confirmed that the difference data is valid by the status of the valid flag, the STC correcting unit 241 judges that a variation in frequency of the clock signal has been detected. Then, the STC correcting unit 241 outputs a load signal to the load data input terminal of the H_STC counter 242, so that the value of the correction data supplied to the load data input terminal is set in the H_STC counter 242.

On the other hand, if it is confirmed that the difference data is invalid by the status of the valid flag, the STC correcting unit 241 judges that a variation in frequency of the clock signal has not been detected. Then, the STC correcting unit 241 continues the control under the variation non-detection without outputting a load signal to the load data input terminal of the H_STC counter 242.

The H_STC counter 242 is a counter for generating a system time clock (STC) in the host device 20. The H_ST counter 242 functions as a host STC counter. A clock signal generated in the clock generating unit 141 of the receiver 10 is sent to the clock input terminal (CK) of the H_STC counter 242 via the clock outputting unit 133 and the clock inputting unit 233. The H_STC counter 242 implements counting by counting the clock signal. Further, the H_STC counter 242 outputs the count data indicative of the number of counting the clock signal, as the host STC data, from the count output terminal (OUT) of the H_STC counter 242, and supplies the host STC data to the STC correcting unit 241, the video decoder 211, and the audio decoder 212.

The H_STC counter 242 has a reset input terminal (R), a load input terminal (L), and the load data input terminal (IN). The H_STC counter 242 is notified of the reset signal through the reset input terminal from the reset receiving unit 235. In response to receiving the reset signal, the H_STC counter 242 sets the count data sent from the count output terminal to an initial value such as zero.

In response to receiving the load signal from the STC correcting unit 241 through the load input terminal, the H_STC counter 242 receives the correction data from the STC correcting unit 241 through the load data input terminal. Then, the H_STC counter 242 sets the count data sent from the count output terminal to a value corresponding to the correction data.

Figure 5:
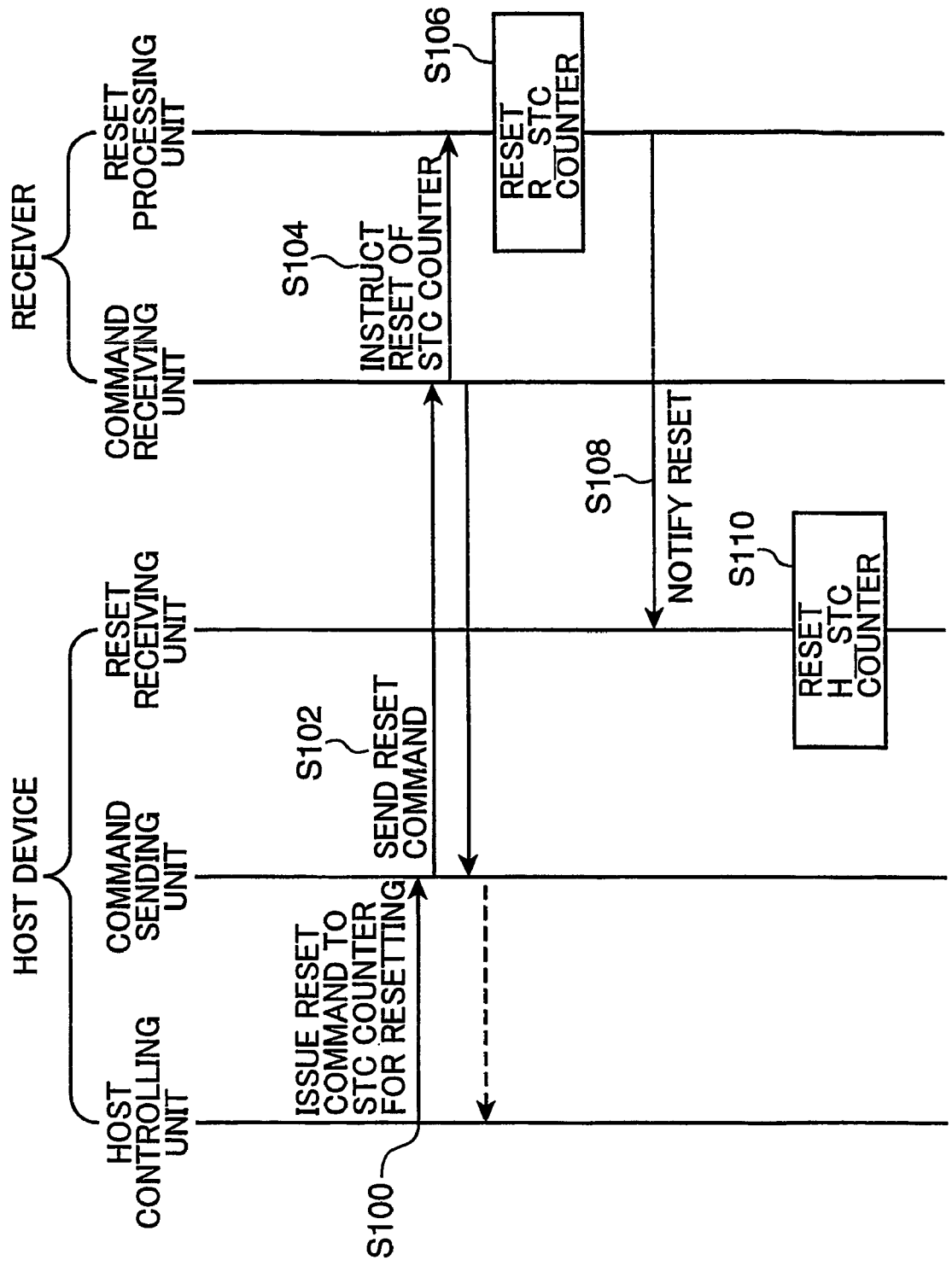
FIG. 5 is an illustration showing a sequence as to how counters in a receiver and a host device in the digital broadcasting receiving system are reset in the first embodiment of the present invention.
Figure 6:
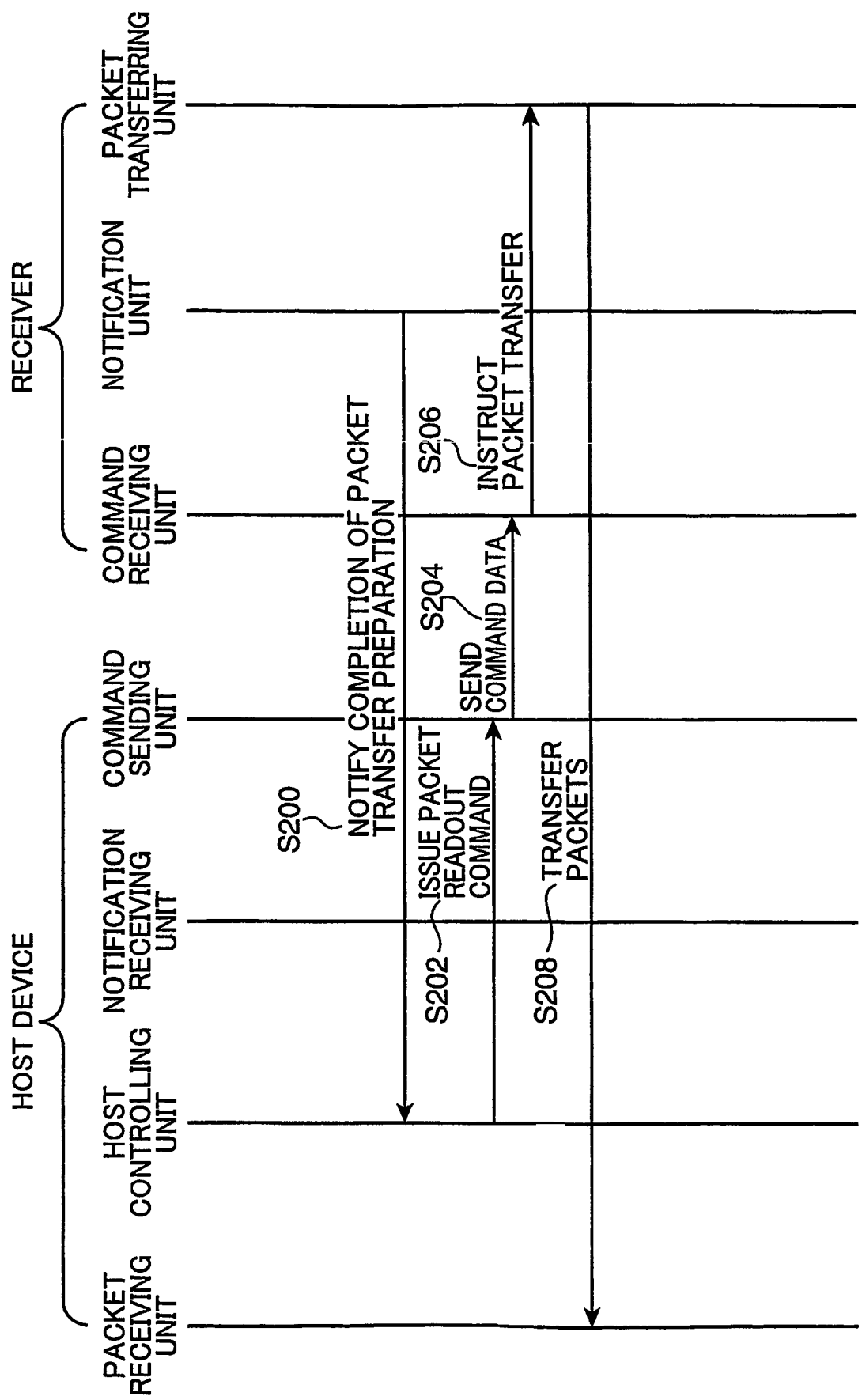
FIG. 6 is an illustration showing a sequence as to how a transport stream is transferred from the receiver to the host device in the digital broadcasting receiving system in accordance with the first embodiment of the present invention.

Next, operations of the digital broadcasting receiving system having the above arrangement are described referring to FIGS. 5 and 6.

FIG. 5 is an illustration showing a sequence as to how the R_STC counter 142 of the receiver 10 and the H_STC counter 242 of the host device 20 are reset. FIG. 6 is an illustration showing a sequence as to how a decoded transport stream is transferred from the receiver 10 to the host device 20.

In the digital broadcasting receiving system of this embodiment, a reset processing as shown in FIG. 5 is executed in the case where the powers of the receiver 10 and the host device 20 are turned on, the transport stream from the tuner unit 111 is changed over in response to switching over of the channel, or a like case. For instance, when the channel is switched over in response to designation of the user, the host controlling unit 291 detects the switching, and starts the reset processing for initialization.

First, the host controlling unit 291 issues a reset command for resetting the R_STC counter 142 to the command sending unit 234 (Step S100). In response to receiving the reset command, the command sending unit 234 sends command data indicative of the reset command to the command receiving unit 134 (Step S102). The command receiving unit 134 analyzes the received command data, and sends a reset signal to the reset processing unit 145 to reset the R_STC counter 142 if it is judged that the command data includes the reset command (Step S104). The reset processing unit 145 resets the R_STC counter 142 based on the reset signal sent from the command receiving unit 134 (Step S106). Then, the reset processing unit 145 notifies the reset receiving unit 235 that the R_STC counter 142 has been reset (Step S108). The reset notification may be sent through a reset signal line from the receiver 10 to the host device 20, for instance. Upon receiving the reset notification, the reset receiving unit 235 executes a reset processing with respect to the H_STC counter 242 (Step S110).

In this embodiment, implementing the above reset processing makes it possible to cause the reset processing unit 145 to perform reset processing simultaneously with respect to the R_STC counter 142 and the H_STC counter 242. Thereby, the R_STC counter 142 and the H_STC counter 242 are initialized, so that these counters 142 and 242 keep on counting the same counter value. Alternatively, the host controlling unit 291 may notify the reset processing unit 145 of the reset signal via the command sending unit 234 and the command receiving unit 134, while resetting the H_STC counter 242.

As mentioned above, the R_STC counter 142 of the receiver 10 and the H_STC counter 242 of the host device 20 are reset simultaneously at the time of startup of the powers of the host device 20 and the receiver 10, or at the time of switching over the channel. Thus, simultaneously resetting the R_STC counter 142 of the receiver 10 and the H_STC counter 242 of the host device 20 makes it possible to cause the clock processing section 14 of the receiver 10 and the clock processing section 24 of the host device 20 to initiate a clock processing under the same condition. In other words, in the digital broadcasting receiving system of this embodiment, the R_STC counter 142 of the receiver 10 and the H_STC counter 242 of the host device 20 are constructed such that the same clock signal generated in the clock generating unit 141 is counted.

Further, the R_STC counter 142 and the H_STC counter 242 output the same counter value at the same counting rate, because the R_STC counter 142 and the H_STC counter 242 start counting from the same initial value by the reset processing. In this way, in the case where there is not detected abnormality such as a poor radio wave receiving condition after startup of the powers of the host device 20 and the receiver 10, or after switching over of the channel, the R_STC counter 142 and the H_STC counter 242 keep on counting the clock signal under the same condition. Thus, the digital broadcasting receiving system of this embodiment continues a normal operation such as transferring of a decoded transport stream from the receiver 10 to the host device 20.

FIG. 6 is an illustration showing a sequence as to how a decoded transport stream is transferred from the receiver 10 to the host device 20. The packet managing unit 124 monitors whether preparation of packet transfer has been completed, e.g., whether a certain number of TS packets have been accumulated in the TS accumulating unit 123. Upon confirming that the TS packet transfer preparation has been completed, the packet managing unit 124 notifies the notification unit 132 of the packet transfer preparation completion. Then, the notification unit 132 notifies the host controlling unit 291 of the preparation completion via the notification receiving unit 232 (Step S200).

In response to receiving the preparation completion notification, the host controlling unit 291 performs control for receiving the TS packets, and issues a TS packet readout command to the command sending unit 234 (Step S202). Then, the command sending unit 234 sends command data indicative of the TS packet readout command to the command receiving unit 134 (Step S204).

Subsequently, the command receiving unit 134 analyzes the received command data, and notifies the packet transferring unit 131 of a packet transfer instruction signal if it is judged that the received command data includes the TS packet readout command to thereby instruct start of transfer of the TS packets accumulated in the TS accumulating unit 123 (Step S206). Then, the packet transferring unit 131 transfers the TS packets accumulated in the TS accumulating unit 123 to the packet receiving unit 231 (Step S208). In this way, the decoded transport stream including the additive data is transferred from the receiver 10 to the host device 20.

If abnormality such as a poor radio wave receiving condition occurs after startup of the powers of the host device 20 and the receiver 10, or after switching of the channel, an error may take place in the decoded transport stream. In such a case, it is likely that the values of the respective data carried by the transport stream may be deviated from a normal value, and the PCR extracting unit 122 may extract PCR data out of the range of the normal value. If such a condition takes place, the recipient STC data sent from the R_STC counter 142 and the PCR data sent from the PCR extracting unit 122 may greatly differ from each other. In other words, the difference data sent from the difference detector 431 of the STC recovering unit 143 may be out of the allowable range of the variation detector 432, with the result that the variation detector 432 outputs a variation detection signal.

In response to output of the variation detection signal from the variation detector 432, the PCR data sent from the PCR extracting unit 122 is set in the R_STC counter 142. As described above, the arrangement of the receiver 10 in this embodiment is advantageous in shortening the time required from unlocking to locking of the clock regenerating loop.

In response to setting of the PCR data in the R_STC counter 142, the R_STC counter 142 starts counting the counter value from the value of the set PCR data. In other words, after the setting of the PCR data in the R_STC counter 142, the R_STC counter 142 of the receiver 10 and the H_STC counter 242 of the host device 20 keep on counting the counter values different from each other. Accordingly, it is necessary to synchronize the clocks in the clock processing section 14 of the receiver 10 and in the clock processing section 24 of the host device 20 with each other and to resume or recover the clock processing sections 14 and 24 to their normal operations.

In order to execute the above control, the digital broadcasting receiving system of this embodiment is constructed such that the receiver 10 is controlled to attach the difference data corresponding to variation information data to the transport stream, as additive information, and the host device 20 is controlled to extract the difference data from the additive information and perform correction, so that the counter value in the H_STC counter 242 and the counter value in the R_STC counter 142 are identical or substantially identical to each other with use of the extracted difference data.

More specifically, referring to the operation of the receiver 10, if the variation detector 432 outputs a variation detection signal, the variation detection signal as well as the difference data are sent to the additive information attaching unit 144. Upon receiving the variation detection signal, the additive information attaching unit 144 sets the valid flag to a state indicating that the difference data is valid, and supplies the difference data and the valid flag to the TS accumulating unit 123. The packet managing unit 124 checks up whether a certain number of TS packets have been accumulated in the TS accumulating unit 123 for transferring the TS packets to the host device 20, and supplies the TS packets to the packet transferring unit 131 if it is judged that the preparation of packet transfer has been completed. At this time, since the additive data is also accumulated in the TS accumulating unit 123, the additive data is also supplied to the packet transferring unit 131. Thereby, the certain number of packets including the additive data are transferred from the packet transferring unit 131 to the packet receiving unit 231 in accordance with the sequence, as shown in FIG. 6.

Referring to the operation of the host device 20, the certain number of packets received in the packet receiving unit 231 are supplied to the additive information extracting unit 222 along with the additive data. The additive information extracting unit 222, then, extracts the additive data from the supplied transport stream, and supplies the difference data and the valid flag included in the additive data to the STC correcting unit 241. Then, the STC correcting unit 241 performs a predetermined computation based on the difference data sent from the additive information extracting unit 222 and the host STC data sent from the H_STC counter 242. Further, the STC correcting unit 241 sets the value of the computation result in the H_STC counter 242.

For instance, let it be assumed that the value of the recipient STC data and the value of the PCR data are "STC1" and "PCR1" respectively at the time when variation is detected. Then, the value of the difference data is "(PCR1−STC1)".

The value "(PCR1−STC1)" is sent to the STC correcting unit 241 as additive information. The STC correcting unit 241 adds the difference data to the host STC data set in the H_STC counter 242. Specifically, if the value of the host STC value set in the H_STC counter 242 is "STC1+n", then, the calculation result by the STC correcting unit 241 is "STC1+n+ (PCR1−STC1)". Thus, the STC correcting unit 241 sets the counter value "PCR1+n" in the H_STC counter 242.

On the other hand, the value of the recipient STC data in the R_STC counter 142 is set to "PCR1+n" at the time when the counter value in the H_STC counter 242 is correctively set by the STC correcting unit 241. In this way, the counter value in the H_STC counter 242 of the host device 20 is corrected, so that the counter value in the H_STC counter 242 is coincident with the counter value in the R_STC counter 142. This means that the processing of the clock processing section 14 of the receiver 10 is synchronized with the processing of the clock processing section 24 of the host device 20, and that the clock processing sections 14 and 24 are resumed or recovered to their normal operations.

Figure 7:
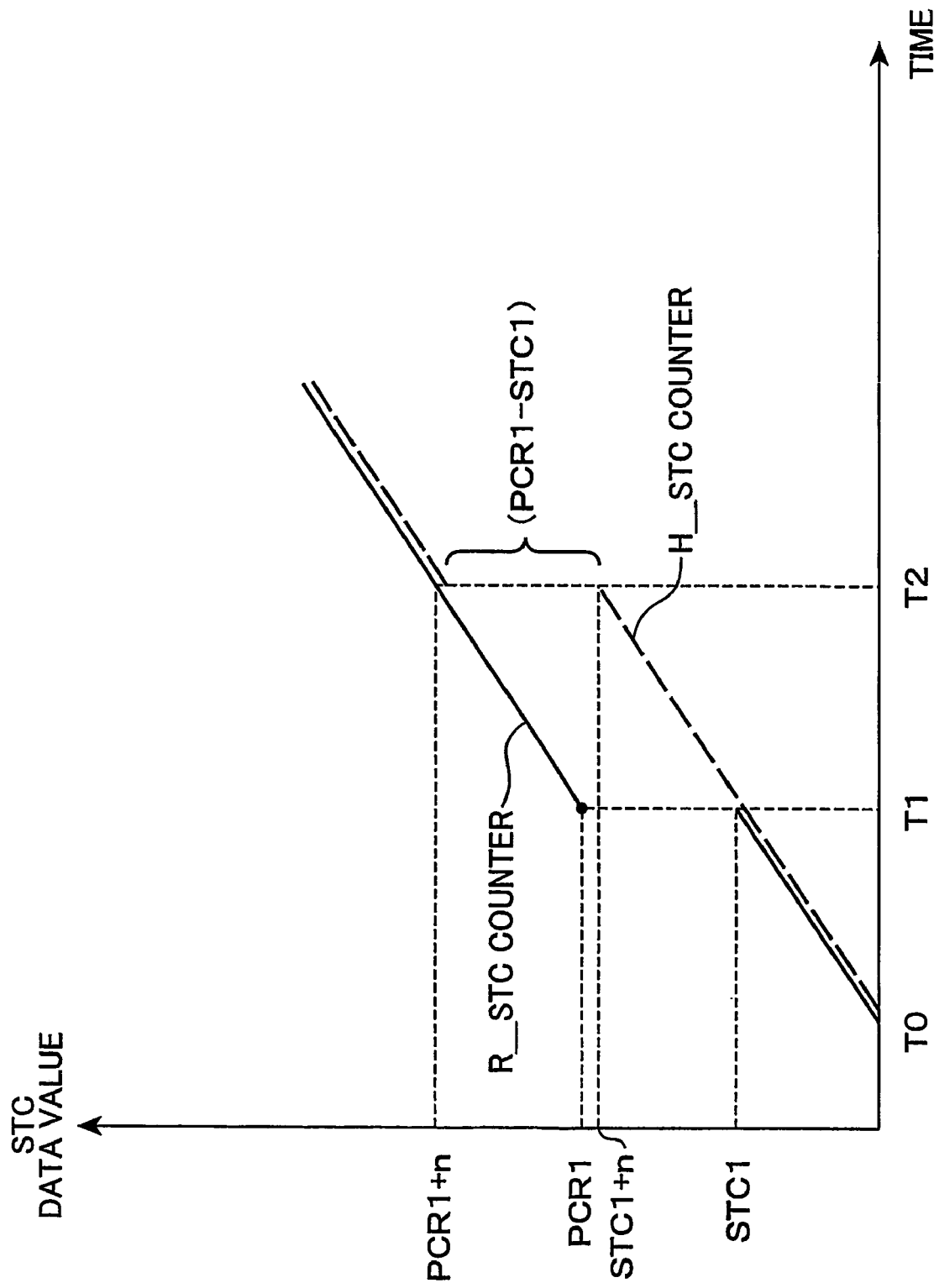
FIG. 7 is a graph showing how values of STC data are changed in setting the same value in counters of the receiver and the host device in the digital broadcasting receiving system in accordance with the first embodiment of the present invention.

FIG. 7 is a graph showing how the values of the STC data in the R_STC counter 142 and the H_STC counter 242 are changed. FIG. 7 shows a state as to how the values of STC data in the R_STC counter 142 and the H_STC counter 242 are changed as time, wherein the axis of abscissas represents the time, and the axis of coordinate represents the values of STC data in the R_STC counter 142 and the H_STC counter 242.

Referring to FIG. 7, the R_STC counter 142 and the H_STC counter 242 are reset at the time T0 in accordance with the sequence as shown in FIG. 5. Thereby, the same initial value is set in the R_STC counter 142 and the H_STC counter 242 to cause the R_STC counter 142 and the H_STC counter 242 to resume their counting operations in synchronism with each other. Then, as shown in FIG. 7, let us assume that synchronization failure is detected in clock regeneration by the variation detector 432 at the time T1.

Here, let us presume that the value of the recipient STC data and the value of the PCR data are respectively "STC1" and "PCR1" at the time T1 when variation is detected. Namely, at the time T1, "PCR1" is set in the R_STC counter 142 as the value of the PCR data. Then, the R_STC counter 142 starts counting the counter value from "PCR1" from the time T1. On the other hand, the H_STC counter 242 keeps counting the counter value in the same manner as before the variation is detected. Accordingly, the difference data "(PCR1−STC1)" is generated in the STC recovering unit 143. Since the difference data is transferred to the STC correcting unit 241 via the additive information attaching unit 144, the packet transferring unit 131, and the packet receiving unit 231, a certain data transfer time is necessary. In view of this, the difference data is supplied to the STC correcting unit 241 at the time T2.

Since the data transfer time n is required as mentioned above, at the time T2, the value of the STC data in the R_STC counter 142 is set to "(PCR1+n)", and the value of the STC data in the H_STC counter 242 is set to "(STC1+n)", respectively. At this time, the difference data, namely, "(PCR1−STC1)", is added to the value in the H_STC counter 242 by the STC correcting unit 241. The result of calculation is "(PCR1+n)". In this way, the STC data of the value identical to the value set in the R_STC counter 142, namely, "(PCR1+n)" is set in the H_STC counter 242 by the STC correcting unit 241.

In the above example, described is the case where the difference data representing the value "(PCR1−STC1)" is transferred from the receiver 10 to the host device 20, as the additive information. The present invention is not limited to this example. Alternatively, "PCR1" as the value of the PCR data, and "STC1" as the value of the recipient STC data may be sent independently of each other at the time when variation is detected.

In the above altered example, the STC correcting unit 241 extracts the difference data "PCR1" and "STCL" from the additive data supplied from the additive information extracting unit 222. The STC correcting unit 241 calculates the value "(PCR1−STC1)" by subtracting the recipient STC data from the PCR data, and adds the difference data, namely, the value "(PCR1−STCL)" to the value "(STC1+n)" set in the H_STC counter 242. Thus, the STC correcting unit 241 sets the addition result "(PCR1+n)." in the H_STC counter 242 as correction data.

Further alternatively, the value of the difference data received in the receiver 10 may be "(STC1−PCR1)". In such an altered arrangement, the STC correcting unit 241 subtracts the difference data from the value "(STC1+n)" set in the H_STC counter 242, and sets the subtraction result "(PCR1+n)" as correction data in the H_STC counter 242.

In this embodiment, described is the case that the difference data is attached to the transport stream as the additive information for transferring the transport stream along with the additive information. Alternatively, the difference data, namely, the PCR data and the recipient STC data obtained at the time of variation detection may be transferred from the notification unit 132 independently of each other. Further alternatively, an interface dedicatedly used for such a data transfer may be provided. In summary, any arrangement may be applicable, as far as variation information data that enables to reproduce the value "PCR1+n" which is identical to the recipient STC data set in the R_STC counter 142 can be transferred from the receiver 10 to the STC correcting unit 241.

Since the interface such as the SD card adopts asynchronous communication as mentioned above, the data transfer time n is not constant. However, according to the embodiment of the present invention, the clocks in the receiver and the host device can be synchronized with each other without depending on the data transfer time n. In other words, the present invention is applicable to any arrangement, irrespective of a condition as to whether the interface to the receiver and the host device adopts synchronous or asynchronous communication.

In this embodiment, the additive information attaching unit 144 sets the valid flag to a state indicating that the difference data is valid in response to receiving a variation detection signal from the variation detector 432, and sets the valid flag to a state indicating that the difference data is invalid in the absence of a variation detection signal. In both of the cases, the system is constructed such that variation information data including the difference data is generated, and the variation information data is sent to the host device. The present invention, however, is not limited to the above arrangement. Alternatively, the additive information attaching unit 144 may generate variation information data exclusively in response to receiving a variation detection signal from the variation detector 432, and send the variation information data to the host device.

Second Embodiment

In the first embodiment, described is the case where the difference data, e.g., "(PCR−STC)" is transferred from the receiver 10 to the host device 20, as additive information, so that the counter values in the counters of the receiver and the host device are coincident with each other.

In this embodiment, described is an arrangement in which counter values in counters of a receiver and a host device are made coincident with each other, even if difference data is not properly transmitted to the host device due to a problem related to a transmission line for transmitting a transport stream signal including the difference data.

Figure 8:
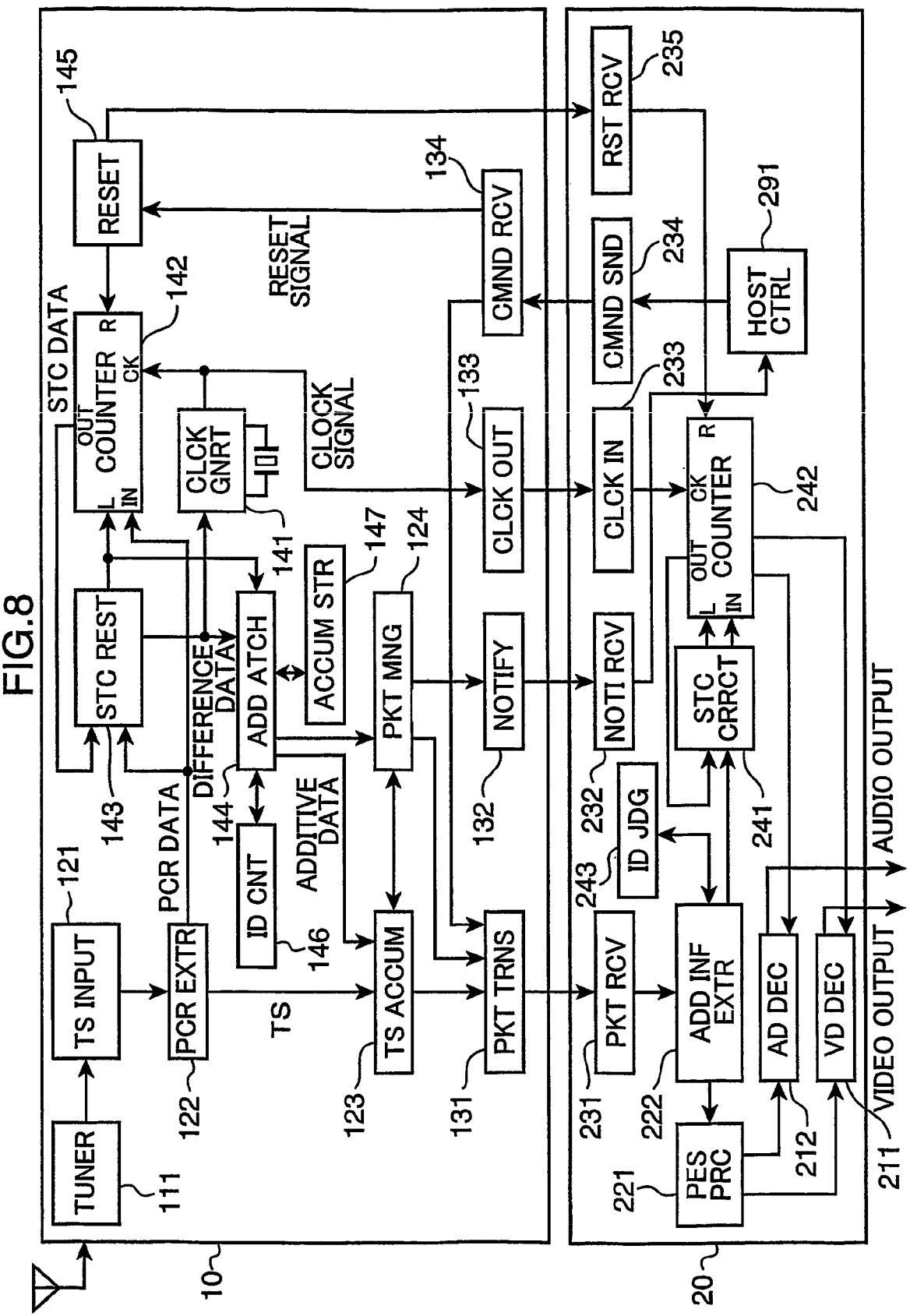
FIG. 8 is a block diagram showing a detailed configuration of a digital broadcasting receiving system in accordance with a second embodiment of the present invention.

FIG. 8 is a block diagram showing a configuration of a digital broadcasting receiving device and a host device in a digital broadcasting receiving system in accordance with the second embodiment of the present invention. Functioning parts in FIG. 8 identified by the same reference numerals as in FIG. 2 have like functions as those in FIG. 2, and accordingly, detailed description thereof will be omitted herein. The second embodiment shown in FIG. 8 is different from the first embodiment shown in FIG. 2 in that the following three functioning parts, namely, an ID counter 146, an accumulative information storing unit 147, and an ID judging unit 243 are additionally provided.

The ID counter 146 is so constructed as to increment the counter value by 1, each time a variation detection signal is sent from an STC recovering unit 143 to an additive information attaching unit 144. Specifically, the ID counter 146 is a functioning part which counts the number of times when a difference between recipient STC data and PCR data has exceeded an allowable range. The ID counter 146 functions as a counter section.

Each time the counter value is incremented by 1 in the ID counter 146, the counter value of the ID counter 146 is recorded in a communication ID included in additive data. The additive data is sent from the receiver 10 to the host device 20. The ID judging unit 243, which will be described later, judges whether the host device 20 has securely acquired all the difference data including PCR data based on the communication ID included in the additive data.

The accumulative information storing unit 147 is so constructed as to accumulatively store difference data, each time a variation detection signal and the difference data are sent from the STC recovering unit 143 to the additive information attaching unit 144. For instance, let it be assumed that the difference data is "(PCR−STC)" at the time of variation detection, where PCR denotes the value of PCR data, and STC denotes the value of recipient STC data. Then, the accumulative information attaching unit 147 accumulatively stores the difference data "(PCR−STC)" which is sent along with a variation detection signal, each time the additive information attaching unit 144 is notified of the variation detection signal.

Thus, the accumulative information storing unit 147 accumulatively stores the difference data which is sent along with the variation detection signal, each time the additive information attaching unit 144 is notified of the variation detection signal. Hereinafter, the difference data that is sent along with the variation detection signal when the additive information attaching unit 144 is notified of the variation detection signal is referred to as "current value", whereas the difference data that has been stored in the accumulative information storing unit 147 is referred to as "accumulative value".

The ID judging unit 243 is a functioning part for judging whether the host device 20 has securely acquired all the difference data including PCR data. The ID judging unit 243 functions as a judging unit. The judgment is made based on the communication ID included in the additive data extracted by an additive information extracting unit 222. The number of times when the difference between the recipient STC data and the PCR data has exceeded the allowable range is recorded in the communication ID. In other words, the counter value counted by the ID counter 146 is successively recorded in the communication ID.

The ID judging unit 243 compares the communication ID that has been read out by the ID judging unit 243 at the last time, with the communication ID that has been read out at the present time by the ID judging unit 243. The ID judging unit 243 judges that the host device 20 has successfully acquired all the difference data including PCR data, if the present communication ID and the last communication ID are serial numbers. On the other hand, the ID judging unit 243 judges that the host device 20 has failed to acquire all the difference data including PCR data, if the present communication ID and the last communication ID are not serial numbers. Judgment as to whether the current value or the accumulative value is adopted as the difference data included in the additive data is made based on the judgment result.

Specifically, the current value is adopted as the difference data if it is judged that the host device 20 has successfully acquired all the difference data including PCR data. In this case, the current value is sent to an STC correcting unit 241 via the additive information extracting unit 222, so that the counter value in a host STC counter, namely, H_STC counter 242, and the counter value in a recipient STC counter, namely, R_STC counter 142 are coincident with each other. On the other hand, if it is judged that the host device 20 has failed to acquired all the difference data including PCR data, it is impossible to compensate for the failure merely by adopting the current value as the difference data, and by performing calculation. In the latter case, the accumulative value is adopted as the difference data, and a certain calculation is implemented to coincide the counter value in the H_STC counter 242 and the counter value in the R_STC counter 142 with each other.

Next, a flow of a process for setting the same counter value in the R_STC counter 142 and the H_STC counter 242 is described referring to FIG. 8.

First, a tuner unit 111 of the receiver 10 applies processing such as demodulation and error correction to a digital broadcasting wave received by an antenna for outputting a demodulated signal. The demodulated signal is transmitted from the tuner unit 111 to a TS inputting unit 121.

Upon receiving the demodulated signal from the tuner unit 111, the TS inputting unit 121 decodes the transport stream based on the demodulated signal. The decoded transport stream is supplied to a PCR extracting unit 122.

The PCR extracting unit 122 detects PID information of each TS packet carried by the supplied transport stream, and extracts the TS packet containing PCR information based on the PID information. Further, the PCR extracting unit 122 extracts the PCR information from the extracted TS packet, and notifies each of the STC recovering unit 143 and the R_STC counter 142 of the extracted PCR information as PCR data. Further, the PCR extracting unit 122 supplies, to a TS accumulating unit 123, the transport stream that has been supplied from the TS inputting unit 121.

A clock generating unit 141 receives the difference data from the STC recovering unit 143, and generates a clock signal of a frequency corresponding to the difference data. The clock generating unit 141 sends the generated clock signal to the R_STC counter 142. Further, the clock generating unit 141 sends the generated clock signal to a clock outputting unit 133, which is a recipient interface for sending the clock signal to the host device 20. The clock signal sent to the clock outputting unit 133 is sent to a clock inputting unit 233, which is a host interface for receiving the clock signal.

Subsequently, the clock signal is sent from the clock inputting unit 233 to a clock input terminal of the H_STC counter 242.

The R_STC counter 142 receives the clock signal from the clock generating unit 141 through the clock input terminal (CK), and implements counting by counting the clock signal. The R_STC counter 142 outputs count data indicative of the counter value of the clock signal from a count output terminal (OUT) as recipient STC data for supplying the recipient STC data to the STC recovering unit 143.

The R_STC counter 142 receives the variation detection signal from the STC recovering unit 143 through a load input terminal (L). In response to receiving the variation detection signal, the R_STC counter 142 acquires the PCR data from the PCR extracting unit 122 through a load data input terminal (IN). Thus, the acquired PCR data is set in the R_STC counter 142, so that the PCR data is to be outputted from the count output terminal as count data.

The STC recovering unit 143 acquires the recipient STC data from the R_STC counter 142, and the PCR data from the PCR extracting unit 122, respectively, obtains a difference between the PCR data and the recipient STC data, and sets the difference as difference data.

As described above, the clock generating unit 141, the R_STC counter 142, and the STC recovering unit 143 constitute a clock generating loop for generating a clock signal synchronous with the reference clock sent from the digital broadcasting station.

As described with reference to FIG. 3, the STC recovering unit 143 detects synchronization failure or abnormality in clock regeneration based on the difference data. For instance, in the case where the difference between the recipient STC data and the PCR data is set as the difference data, the STC recovering unit 143 monitors whether the difference data is within an allowable range defined by a predetermined upper limit and a predetermined lower limit. If it is detected that the difference data is out of the allowable range, then, the STC recovering unit 143 judges that synchronization failure or abnormality has taken place, and outputs a variation detection signal to the load input terminal of the R_STC counter 142. The STC recovering unit 143 sends the variation detection signal and the difference data to the additive information attaching unit 144 upon detecting that the difference data is out of the allowable range. The STC recovering unit 143 may monitor the absolute value of the difference data, and output a variation detection signal if the difference data exceeds the allowable upper limit.

The additive information attaching unit 144 generates additive information, which is used in attaching the variation information data (difference data) to the transport stream decoded by the TS inputting unit 121. The additive information includes the difference data and a valid flag indicating whether the difference data is valid or not. The valid flag is operated such that the flag is brought to a state showing that the difference data is valid if a variation detection signal is notified, and the flag is brought to a state that the difference data is invalid in the absence of a variation detection signal.

The additive information attaching unit 144 performs the following processing based on the variation detection signal and the difference data sent from the STC recovering unit 143. First, in response to receiving the variation detection signal, the additive information attaching unit 144 controls the ID counter 146 to increment the counter value by 1. Then, the additive information attaching unit 144 records the counter value set in the ID counter 146 in the additive information.

Now, an example of a communication format of transferring data from a packet transferring unit 131 is shown in FIG.

Figure 9:
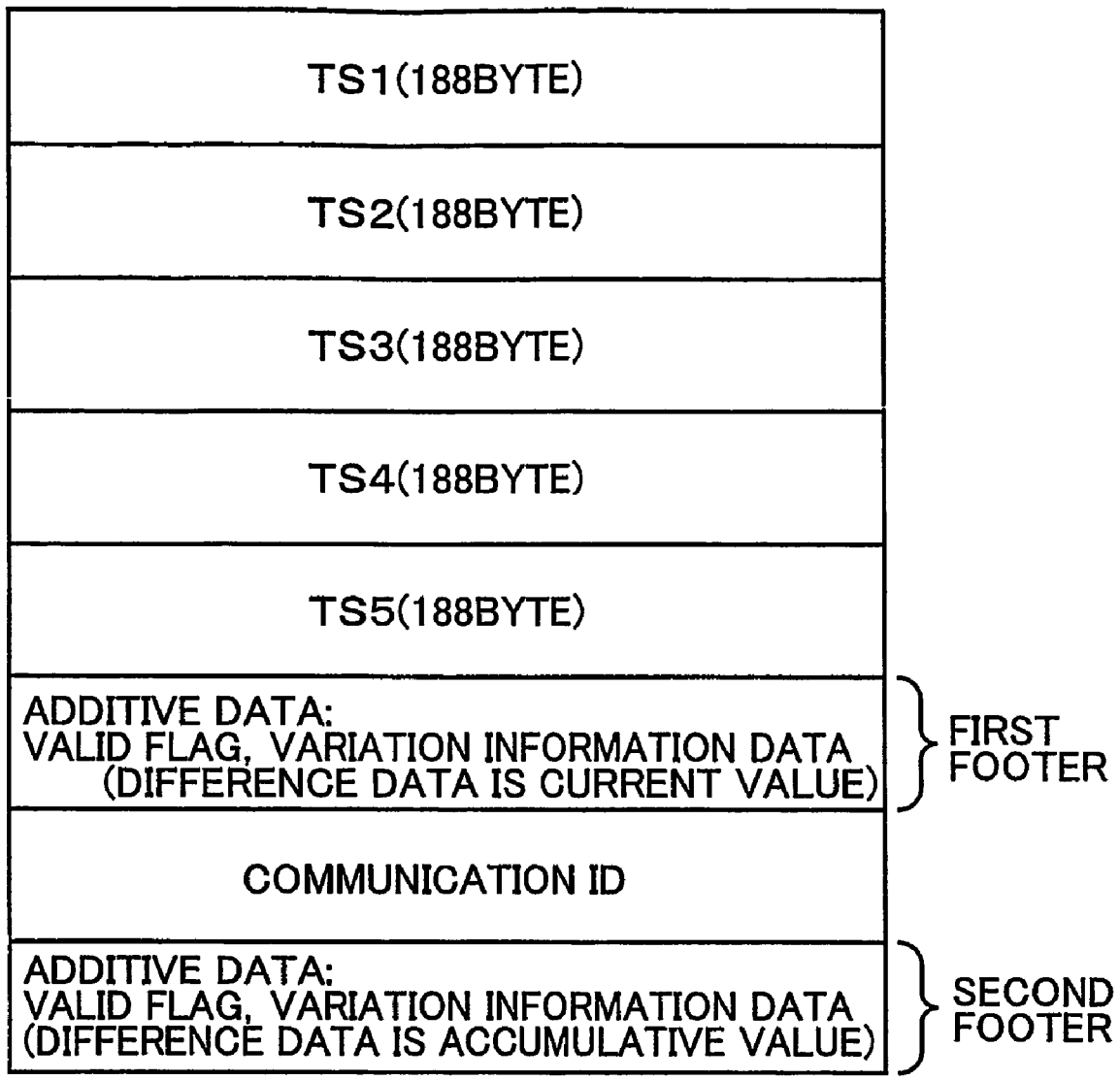
FIG. 9 is an illustration showing an example of a communication format of data to be transferred from a packet transferring unit in the digital broadcasting receiving system in accordance with the second embodiment of the present invention.

9. Referring to FIG. 9, TS1 through TS5 each denotes a TS packet decoded by the TS inputting unit 121. As mentioned above, in the case where a variation is detected by the STC recovering unit 143, the additive information is attached to the transport stream by the additive information attaching unit 144.

For instance, the additive information is constructed such that the current value of the difference data is written in the first footer, and the accumulative value of the difference data is written in the second footer. The accumulative value of the difference data is a value stored in the accumulative information storing unit 147. A communication ID carrying the counter value in the ID counter 146 is written in between the first footer and the second footer. The communication ID is updated each time a variation is detected.

The first footer and the second footer each contains at least a valid flag indicating whether the variation detection signal has been notified, namely, the difference data is valid, in addition to the difference data. The packet transferring unit 131 transfers the transport stream carrying the additive information to the host device 20 bit by bit in accordance with the above defined communication format.

Further, the additive information attaching unit 144 supplies the difference data to the accumulative information storing unit 147. Since the accumulative information storing unit 147 accumulatively stores the difference data that have been supplied from the additive information attaching unit 144 one after another, the latest supplied difference data is accumulatively stored in the accumulative information storing unit 147. For example, let it be assumed that the difference data is "(PCRn–STCn)" at the n-th time of variation detection, where "PCRn" denotes the value of PCR data, "STCn" denotes the value of recipient STC data, and n is an integer representing the number of times of variation detection. Then, the accumulative information attaching unit 147 accumulatively stores the difference data "(PCR–STC)", which is sent along with the variation detection signal, each time the additive information attaching unit 144 is notified of the variation detection signal.

Here, let it be assumed that the accumulative value of the difference data that has been stored in the additive information storing unit 147 up to the (x–1)-th time of variation detection is "SUM", and the difference data which is notified at the x-th time of variation detection is "(PCRx–STCx)", where x is an integer representing the number of times of variation detection. In this case, the accumulative information storing unit 147 performs calculation: SUM+(PCRx–STCX), and stores the calculation result therein. In this way, the accumulative information storing unit 147 accumulatively stores the difference data that is sent along with the variation information signal, each time the additive information attaching unit 144 is notified of the variation detection signal. The additive information attaching unit 144 adds the accumulated difference data to the additive information.

The additive information attaching unit 144 supplies, to the TS accumulating unit 123, the additive information including the latest supplied difference data (current value of the difference data), the counter value in the ID counter 146 representing the number of times of variation detection, and the accumulative value of the difference data. At this time, the additive information attaching unit 144 notifies a packet managing unit 124 that the additive information has been supplied to the TS accumulating unit 123.

The packet managing unit 124 controls the TS accumulating unit 123 such that the additive information supplied from the additive information attaching unit 144 be attached to each of the TS packets sent from the PCR extracting unit 122.

In response to receiving the control command from the packet managing unit 124, the TS accumulating unit 123 stores the additive information supplied from the additive information attaching unit 144 along with the TS packets supplied from the PCR extracting unit 122.

The packet managing unit 124 checks up the TS accumulating unit 123 as to whether a certain number of packets to be transferred to the host device 20 have been accumulated in the TS accumulating unit 123. Upon confirming that the packet transfer preparation has been completed, the packet managing unit 124 causes the TS accumulating unit 123 to supply a transport stream constituted of the TS packets and the additive information to the packet transferring unit 131. At this time, the packet managing unit 124 notifies the notification unit 132 that the packet transfer preparation has been completed.

In response to receiving the notification, the notification unit 132 notifies the notification receiving unit 232 as a host interface that the packet transfer preparation has been completed. Then, the notification receiving unit 232 transfers the notification to the host controlling unit 291.

In response to receiving the notification of packet transfer preparation completion, the host controlling unit 291 issues a TS packet readout command to the command sending unit 234. As a result, the command sending unit 234 sends, to the command receiving unit 134, command data, i.e., the TS packet readout command. The command receiving unit 134 analyzes the received command data, and notifies the packet transferring unit 131 of a packet transfer instruction signal if it is judged that the received command data includes the TS packet readout command. Thereby, the packet transferring unit 131 transfers the TS packets accumulated in the TS accumulating unit 123 to the packet receiving unit 231. In this way, the decoded transport stream including the additive data is transferred from the receiver 10 to the host device 20 in accordance with the above-mentioned processing procedure.

The packet receiving unit 231 supplies the transport stream sent from the packet transferring unit 131 to the additive information extracting unit 222, which in turn, supplies the transport stream to the PES processing unit 221.

The PES processing unit 221 separates the supplied transport stream into video packets containing video data, audio packets containing audio data, and information data packets containing information relating to data receiving and the like. Subsequently, the PES processing unit 221 isolates the packets containing contents data of the respective programs such as video packets and audio packets to restructure the PES. The PES processing unit 221 supplies the restructured PES to the video decoder 211 and the audio decoder 212.

The additive information extracting unit 222 extracts the additive information from the transport stream supplied from the packet receiving unit 231. As shown in FIG. 9, the communication ID carrying the number of times of variation detection is included in the additive information, as well as the valid flag, the current value of the difference data, and the accumulative value of the difference data. The additive information extracted by the additive information extracting unit 222 is supplied to the ID judging unit 243, which, in turn, judges whether the host device 20 has securely acquired all the difference data including PCR data.

The ID judging unit 243 reads out the present counter value in the ID counter 146 by retrieving the communication ID included in the additive data extracted by the additive information extracting unit 222. Here, the ID judging unit 243 compares the counter value read out by the ID judging unit 243 at the last time, with the present readout counter value. If it is judged that these counter values are serial integers, the judgment result indicates that the host device 20 has acquired all the difference data including PCR data properly without fail. On the other hand, if it is judged that the counter values are not serial integers, the judgment result indicates that the host device 20 failed to acquired all the difference data including PCR data. Then, it is determined whether the current value or the accumulative value be adopted as the difference data included in the additive data, based on the judgment result.

Specifically, let it be assumed that the STC recovering unit 143 detected the third-time synchronization failure or abnormality, namely, variation. In such a case, the counter value in the ID counter 146 is set to "3", and likewise, the value "3" is recorded in the communication ID included in the additive information. Further, the accumulative information storing unit 147 accumulatively stores the current value of the difference data: "SUM3(=PCRC3−STC3)". Here, SUMn=PCRn−STCn, where n is an integer representing the number of times of variation detection. The transport stream carrying the counter value and the difference data is supplied to the TS accumulating unit 123.

Thereafter, the communication ID in the transport stream is supplied to the ID judging unit 243 via the packet transferring unit 131, the packet receiving unit 231, and the additive information extracting unit 222. The ID judging unit 243 compares the currently-stored value "2", with the value "3" recorded in the communication ID. The result of the comparison shows that these numbers are serial integers. Accordingly, the ID judging unit 243 judges that the host device 20 has securely acquired all the difference data including PCR data, increments the currently-stored value by 1 to thereby set the value "3", and requests the additive information extracting unit 222 to read out the information written in the first footer of the additive information.

Upon receiving the command, the additive information extracting unit 222 supplies, to the STC correcting unit 241, the current value of the difference data which has been written in the first footer. The STC correcting unit 241 extracts the valid flag, and the current value of the difference data: "SUM3 (=PCR3−STC3)" from the supplied additive information.

Thus, in a similar manner as described in the first embodiment, the counter value in the H_STC counter 242 of the host device 20 can be correctively coincident with the counter value in the R_STC counter 142 of the receiver 10.

Subsequently, let it be assumed that the STC recovering unit 143 detected the fourth-time variation. In such a case, the counter value in the ID counter 146 is incremented to "4" by way of the additive information attaching unit 144. The value recorded in the communication ID in the additive information is updated to "4" in conformance with the increment of the counter value. Simultaneously, the accumulative information storing unit 147 accumulatively stores the current value of the difference data: "SUM4(=PCR4−STC4)". Then, the transport stream carrying the counter value and the difference data is supplied to the TS accumulating unit 123. Here, let it be presumed that the host device 20 has failed to receive the transport stream due to a drawback such as data communication failure between the packet transferring unit 131 and the packet receiving unit 231. In such a case, the ID judging unit 243 cannot retrieve the communication ID included in the transport stream, with the result that the value "3" is kept being stored.

Subsequently, let it be assumed that the STC recovering unit 143 detected the fifth-time variation. Then, the counter value in the ID counter 146 is incremented to "5" by way of the additive information attaching unit 144. The value recorded in the communication ID in the additive information is updated to "5" in conformance with the increment of the counter value. Simultaneously, the accumulative information storing unit 147 accumulatively stores the current value of the difference data: "SUM5(=PCR5−STC5)". Then, the transport stream carrying the counter value and the difference data is supplied to the TS accumulating unit 123.

Thereafter, the communication ID in the transport stream is supplied to the ID judging unit 243 via the packet transferring unit 131, the packet receiving unit 231, and the additive information extracting unit 222. The ID judging unit 243 compares the currently-stored value "3" with the value set in the communication ID "5". The result of the comparison shows that these values are not serial integers. Accordingly, the ID judging unit 243 judges that the host device 20 has failed to acquired all the difference data including PCR data, increments the currently-stored value to the present value set in the communication ID, namely, to "5", and notifies the additive information extracting unit 222 of a command requesting readout of information stored in the second footer of the additive information. In response to receiving the command, the additive information extracting unit 222 supplies the difference data written in the second footer to the STC correcting unit 241. The STC correcting unit 241 extracts the valid flag, and the accumulative value of the difference data: "SUM1+SUM2+SUM3+SUM4+SUM5" from the supplied additive information. The process thereafter is carried out in the similar manner as described in the first embodiment, so that the counter value in the H_STC counter 242 of the host device 20 can be correctively coincident with the counter value in the R_STC counter 142 of the receiver 10.

Figure 10:
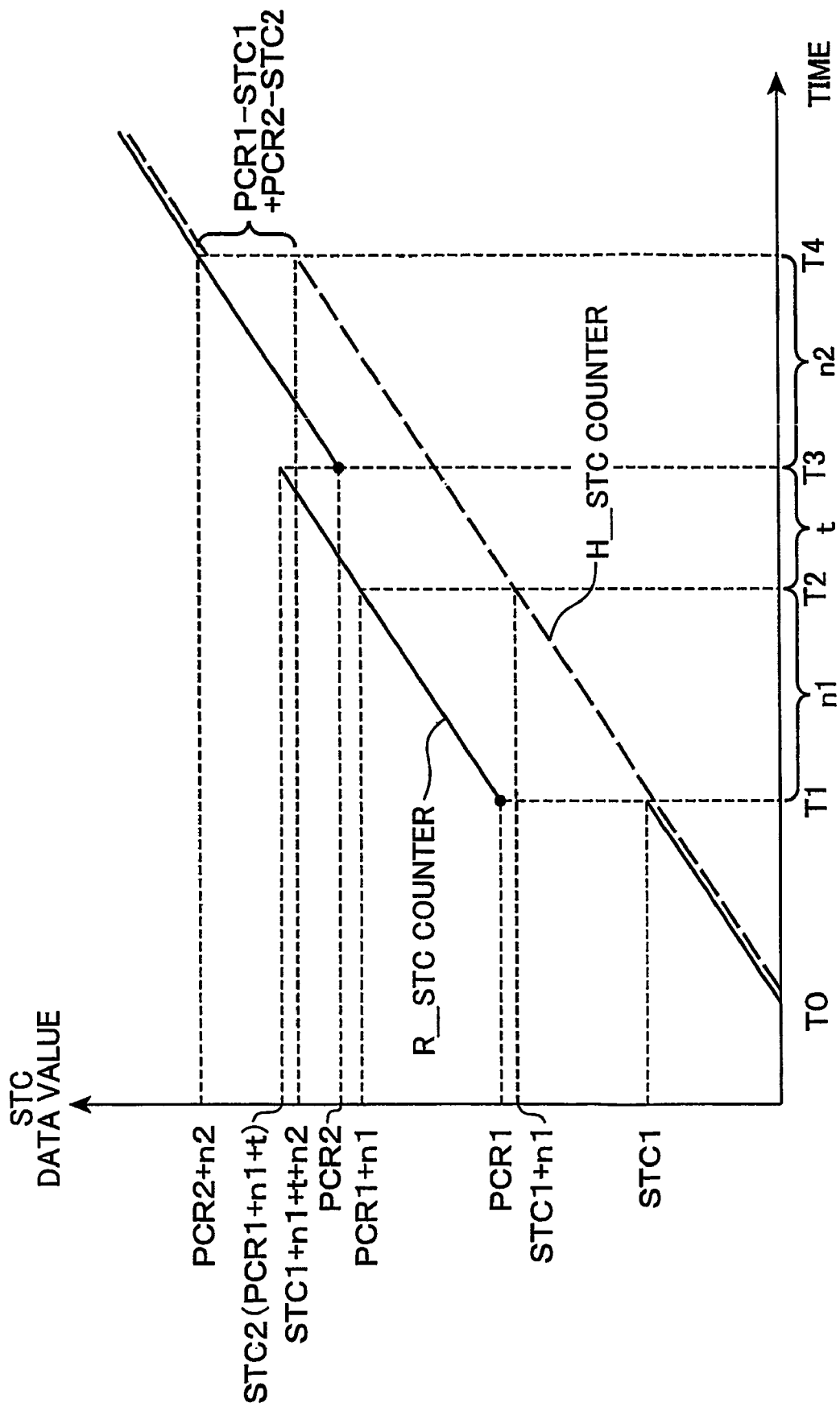
FIG. 10 is a graph showing how values of STC data are changed in setting the same value in counters of the receiver and the host device in the digital broadcasting receiving system in accordance with the second embodiment of the present invention.

Next, a flow of the correction is described referring to FIG. 10. FIG. 10 is a graph showing how values of STC data are changed in the R_STC counter 142 and the H_STC counter 242. FIG. 10 shows a state as to how the values of STC data in the R_STC counter 142 and the H_STC counter 242 are changed as time, wherein the axis of abscissas represents the time, and the axis of coordinate represents the values of STC data in the R_STC counter 142 and the H_STC counter 242.

Referring to FIG. 10, the R_STC counter 142 and the H_STC counter 242 are reset at the time T0 in accordance with the sequence as shown in FIG. 5. Thereby, the same initial value is set in the R_STC counter 142 and the H_STC counter 242 to cause the R_STC counter 142 and the H_STC counter 242 to resume their counting operations in synchronism with each other. Then, as shown in FIG. 10, let us assume that synchronization failure is detected in clock regeneration by the variation detector 432 at the time T1.

Here, let us presume that the value of the recipient STC data and the value of the PCR-data are respectively "STC1" and "PCR1" at the time T1 when variation is detected. Namely, at the time T1, "PCR1" is set in the R_STC counter 142 as the value of the PCR data. Then, the R_STC counter 142 starts counting the counter value from "PCR1" from the time T1. On the other hand, the H_STC counter 242 keeps counting the counter value in the same manner as before the variation is detected.

At this time, the difference data generated in the accumulative information storing unit 147 is the current value of the difference data: "SUM1(=PCR1−STC1)". Since the difference data is transferred to the STC correcting unit 241 via the additive information attaching unit 144, the packet transferring unit 131, and the packet receiving unit 231, a certain data transfer time or the like is necessary. In view of this, the difference data is supplied to the STC correcting unit 241 at the time T2.

Since the data transfer time n1 is required for the reason as mentioned above, at the time T2, the value of the STC data in the R_STC counter 142 is set to "(PCR1+n1)", and the value of the STC data in the H_STC counter 242 is set to "(STC1+n1)", respectively.

In the first embodiment, at the time T2, the difference data, namely, "(PCR1−STC1)", is added to the value in the H_STC counter 242 by the STC correcting unit 241. Thereby, the STC data of the value identical to the value set in the R_STC counter 142, namely, "(PCR1+n)" is set in the H_STC counter 242 by the STC correcting unit 241.

In the second embodiment, however, the difference data is not properly transmitted to the host device 20 at the time T2 due to a transmission failure of the transmission line for transmitting the stream signal including the difference data. Namely, the host device 20 failed to acquire the difference data at the time T2. Nevertheless, the H_STC counter 242 and the R_STC counter 142 keep on counting the same counter value, despite the transmission failure.

Subsequently, let it be assumed that synchronization failure in clock regeneration has been detected by the variation detector 432 at the time T3, as shown in FIG. 10.

Here, the value of the recipient STC data is "STC2 (=PCR1+n1+t)", and the value of the PCR data is "PCR2" at the time of T3. In other words, "PCR2", which is the value of the PCR data at the time of variation detection, is set in the R_STC counter 142. Thereby, the R_STC counter 142 starts counting from "PCR2" from the time T3, whereas the H_STC counter 242 keeps on counting as before.

At this time, the difference data generated in the accumulative information storing unit 147 is the accumulative value of the difference data: "SUM1+SUM2(=PCR1−STC1+PCR2−STC2)". The difference data is supplied to the STC correcting unit 241 at the time T4. Further, since a certain data transfer time n2 is necessary, the values of the STC data in the R_STC counter 142 and the H_STC counter 242 are respectively set to "(PCR2+n2)" and "(STC1+n1+t+n2)" at the time T4.

If the aforementioned difference data is added to the value of the STC data in the H_STC counter 242 by the STC correcting unit 241, then, the addition result is "(PCR2+n2)" because "STC2" equals to "(PCR1+n1+t)". Thus, the value of the STC data set in the H_STC counter 242 is made coincident with that in the R_STC counter 142.

As described above, in the second embodiment, using the accumulative value of the difference data generated in the accumulative information storing unit 147 makes it possible to coincide the counter values in the R_STC counter 142 and the H_STC counter 242 with each other, even if the host device 20 failed to acquire all the difference data.

As mentioned above, since the counter values in the receiver 10 and the host device 20 are coincident with each other, the video and audio data can be played back securely. Specifically, the video decoder 211 extracts the video packets from the supplied PES, decodes the video signal based on the video data in the video packets, and outputs the decoded video signal to the monitor or a like device. Likewise, the audio decoder 212 extracts the audio packets from the supplied PES, decodes the audio signal based on the audio data in the audio packets, and output the decoded audio signal to the speaker or a like device.

In this embodiment, described is the case where the accumulative value of the difference data "(PCR−STC)" is transferred from the receiver 10 to the host device 20 as additive information. The present invention is not limited to the above. Alternatively, the accumulative value of the PCR data, and the accumulative value of the recipient STC data obtained at the time of variation detection may be transferred. Further alternatively, the STC correcting unit 241 may implement subtraction with use of the accumulative value of the difference data "(STC−PCR)".

In this embodiment, described is the case that the difference data is attached to the transport stream as the additive information for transferring the transport stream along with the additive information. The present invention is not limited to the above. Alternatively, the difference data, namely, the PCR data and the recipient STC data obtained at the time of variation detection may be transferred from the notification unit 132 independently of each other. Further alternatively, an interface dedicatedly used for such a data transfer may be provided. In summary, any arrangement may be applicable, as far as variation information data that enables to reproduce the value which is identical to the value of the recipient STC data set in the R_STC counter 142 can be transferred from the receiver 10 to the STC correcting unit 241.

Third Embodiment

In the foregoing embodiments, the receiver 10 and the host device 20 are configured such that the respective elements or blocks (functioning parts) each having a certain function in the receiver 10 and the host device 20 may be constituted of individual semiconductor integrated circuits. Further alternatively, some of the elements may constitute a single semiconductor integrated circuit. The semiconductor integrated circuit may be, for instance, a large scale integration (LSI).

Some of the elements constituting the host device 20 in the first or second embodiment may constitute a functioning block. For instance, the host device 20 may be classified into the following four functioning blocks. The first functioning block is a counter correction block, which is constituted of the additive information extracting unit 222, the STC correcting unit 241, and the H_STC counter 242. The second functioning block is a control block, which is constituted of the host controlling unit 291. The third functioning block is an interface block, which is constituted of the packet receiving unit 231, the notification receiving unit 232, the clock inputting unit 233, the command sending unit 234, and the reset receiving unit 235. The fourth functioning block is a decoder block, which is constituted of the video decoder 211, the audio decoder 212, and the PES processing unit 221.

Figure 11:
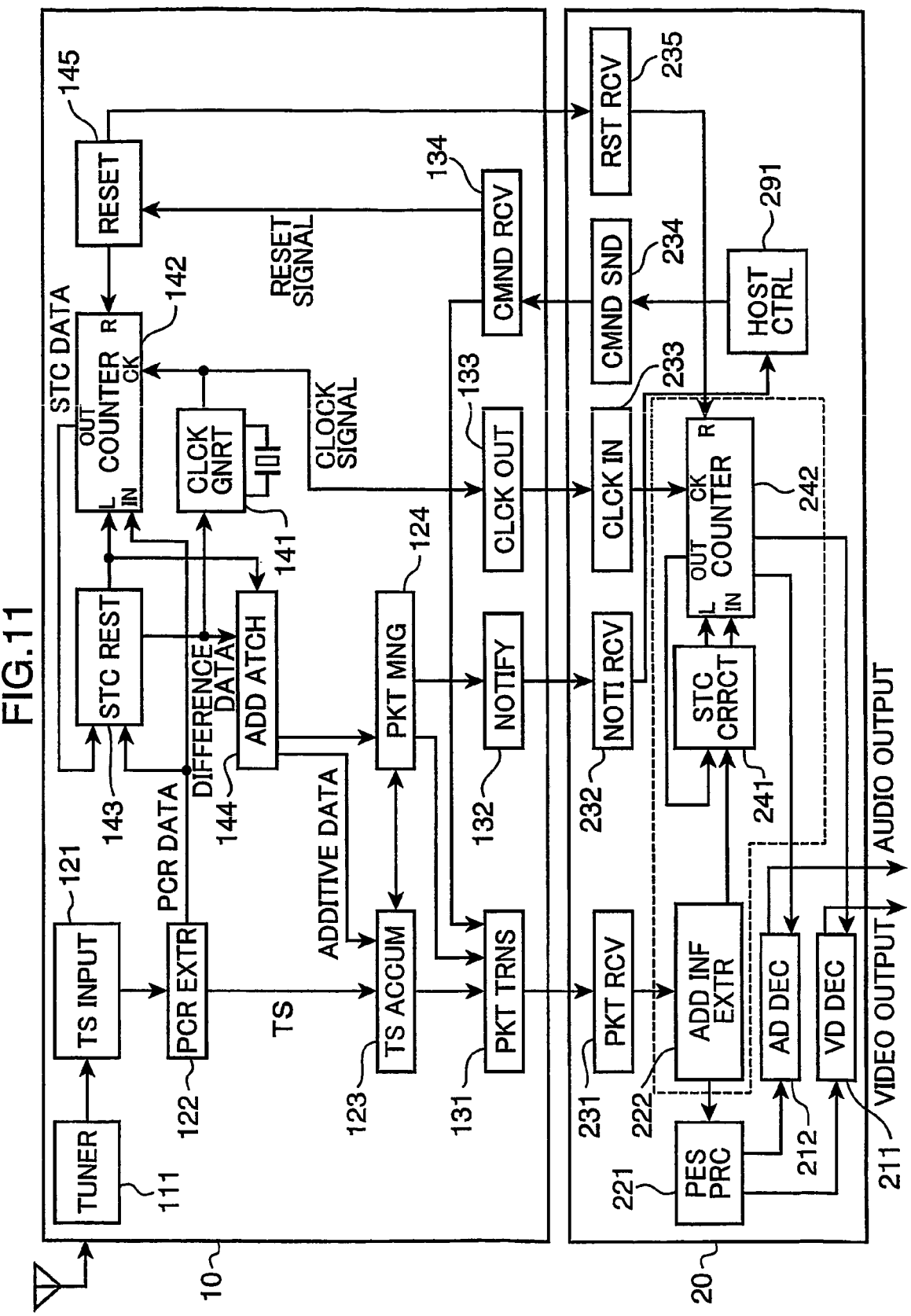
FIG. 11 is a block diagram showing an example of a functioning block constituting a semiconductor integrated circuit used in the present invention.

FIG. 11 is a block diagram exemplarily showing an entire configuration of a digital broadcasting receiving system in accordance with the third embodiment of the present invention. The arrangement shown in FIG. 11 is substantially identical to that in FIG. 2 showing the receiver 10 and the host device 20, except that some of the elements or functioning parts in a host device 20 in the third embodiment, which are recommended to constitute a single semiconductor integrated circuit, are enclosed by the rectangular block of the dotted line.

In the example of FIG. 11, a semiconductor integrated circuit is constituted of the counter correction block in the host device 20, namely, an additive information extracting unit 222, an STC correcting unit 241, and an H_STC counter 242.

The semiconductor integrated circuit having the above arrangement plays a primary role in the host device 20 for synchronizing the clocks in the receiver 10 and the host device 20, as described in the first or second embodiments. Specifically, the additive information extracting unit 222 in the semiconductor integrated circuit extracts a valid flag and difference data sent from a receiver 10 for sending to the STC correcting unit 241. If it is judged that the received valid flag indicates that the difference data is valid, the STC correcting unit 241 performs computation based on the difference data and host STC data. Then, the STC correcting unit 241 sets the computation result in the H_STC counter 242 as correction data. Thus, the clock synchronization can be executed between the receiver 10 and the host device 20 in this embodiment.

Figure 12:
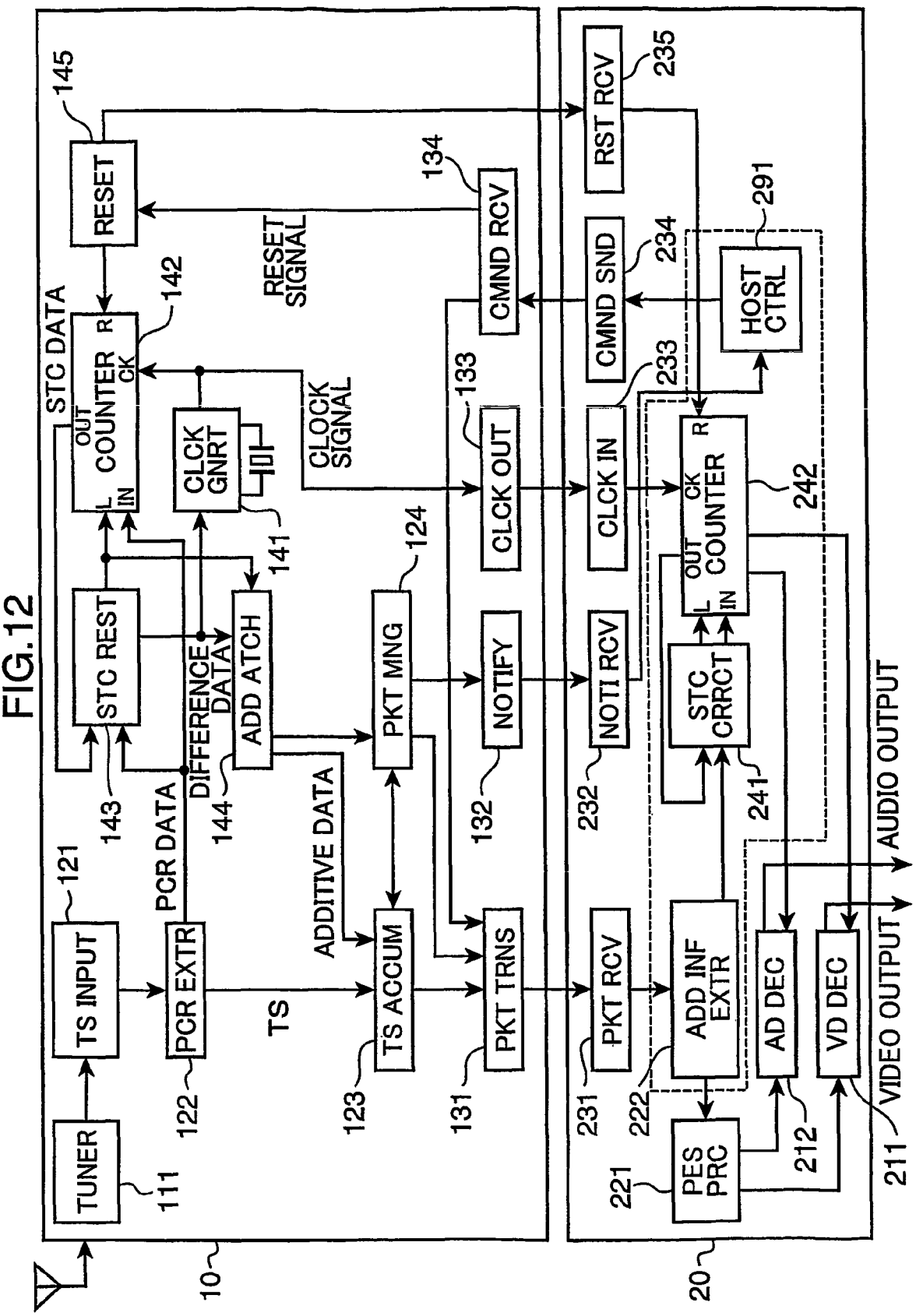
FIG. 12 is a block diagram showing another example of the functioning blocks constituting the semiconductor integrated circuit used in the present invention.

As an altered arrangement, as shown in FIG. 12, a semiconductor integrated circuit may be constituted of a functioning block corresponding to the counter correction block shown in FIG. 11, and a control block constituted of a host controlling unit 291. This altered arrangement makes it possible to allow the host controlling unit 291 to send command data such as a reset command, or to control the respective elements or functioning parts, thus allowing the semiconductor integrated circuit to function as an active circuit for controlling the respective elements or functioning parts.

Figure 13:
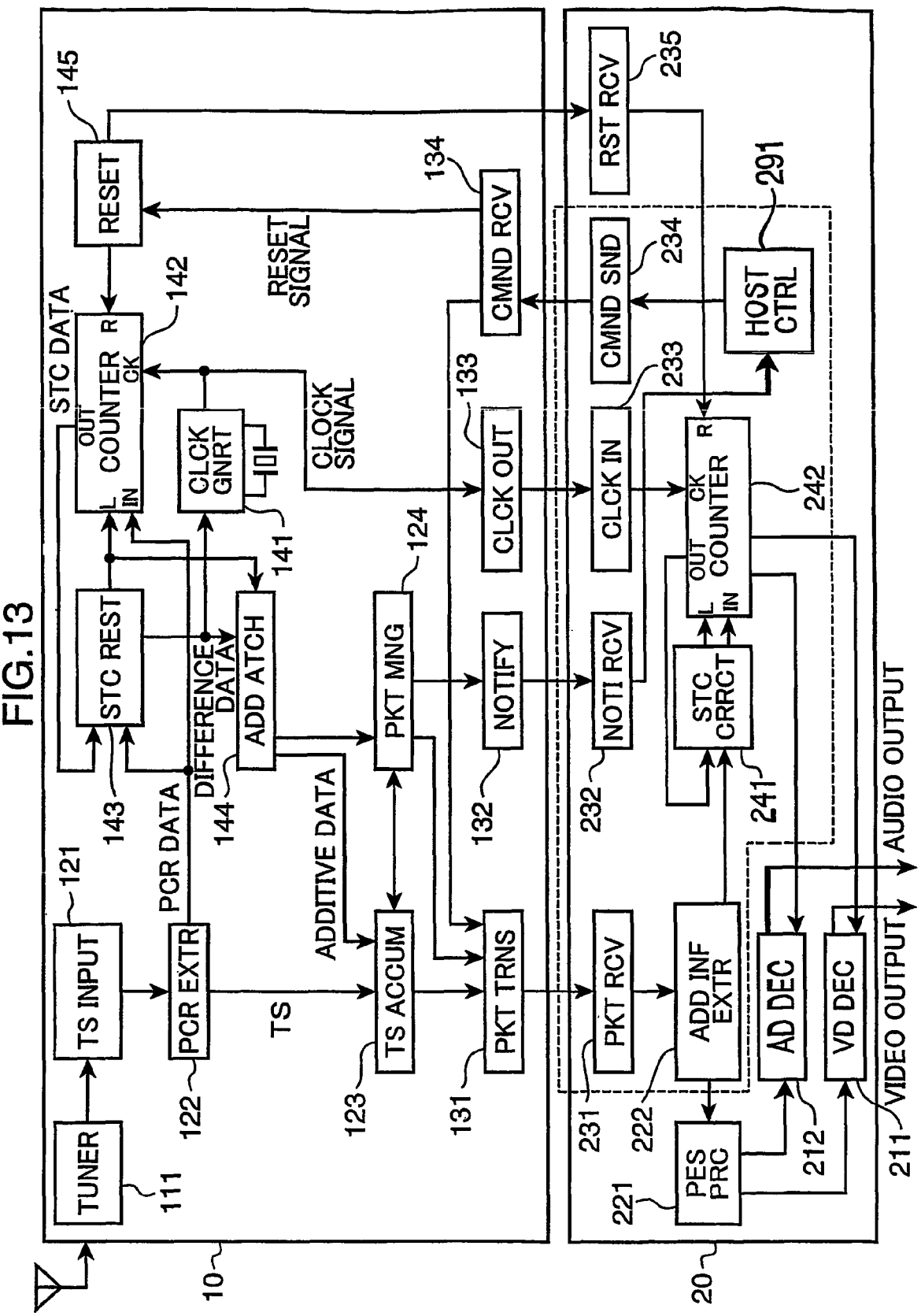
FIG. 13 is a block diagram showing yet another example of the functioning blocks constituting the semiconductor integrated circuit used in the present invention.
Figure 14:
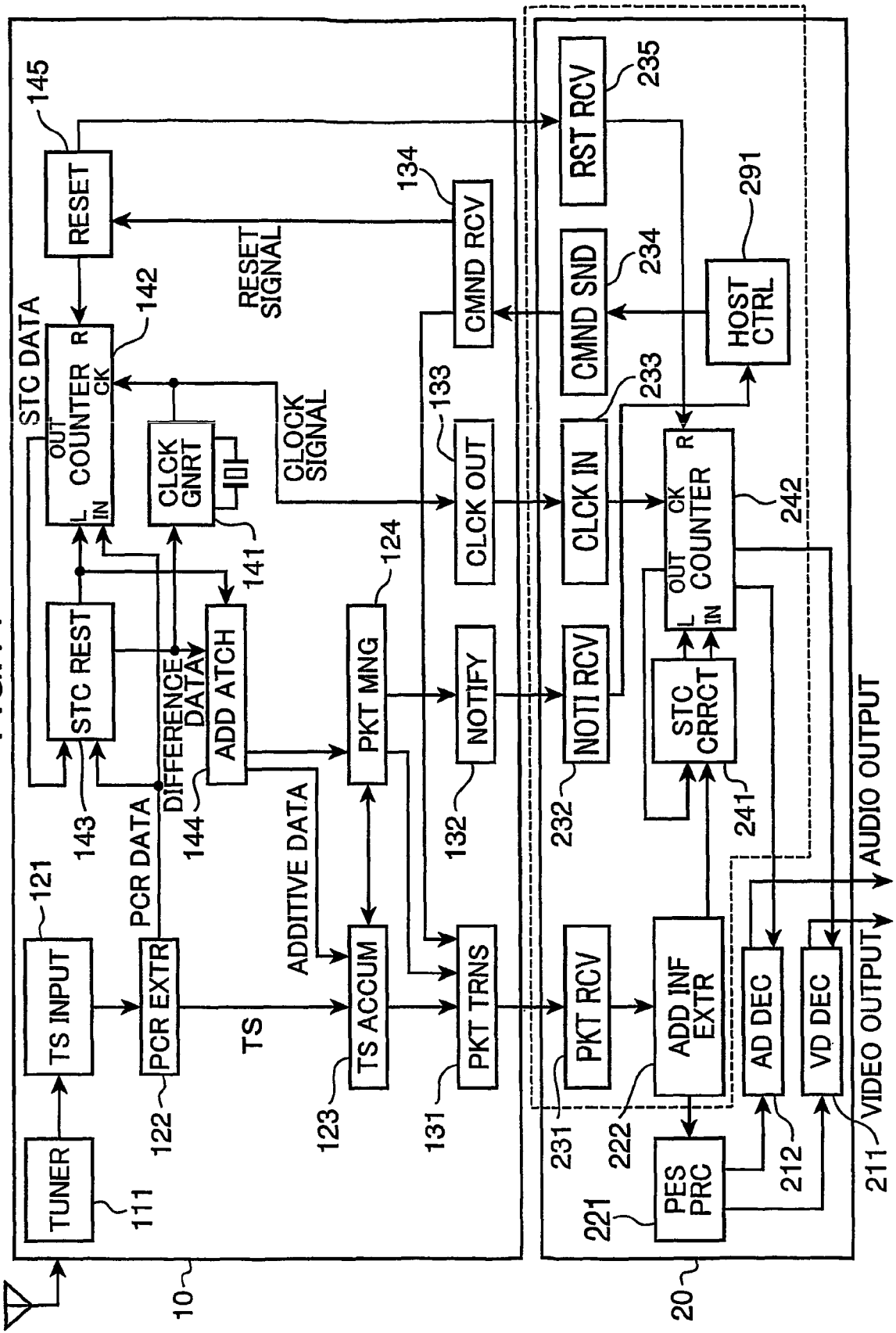
FIG. 14 is a block diagram showing a further example of the functioning blocks constituting the semiconductor integrated circuit used in the present invention.
Figure 15:
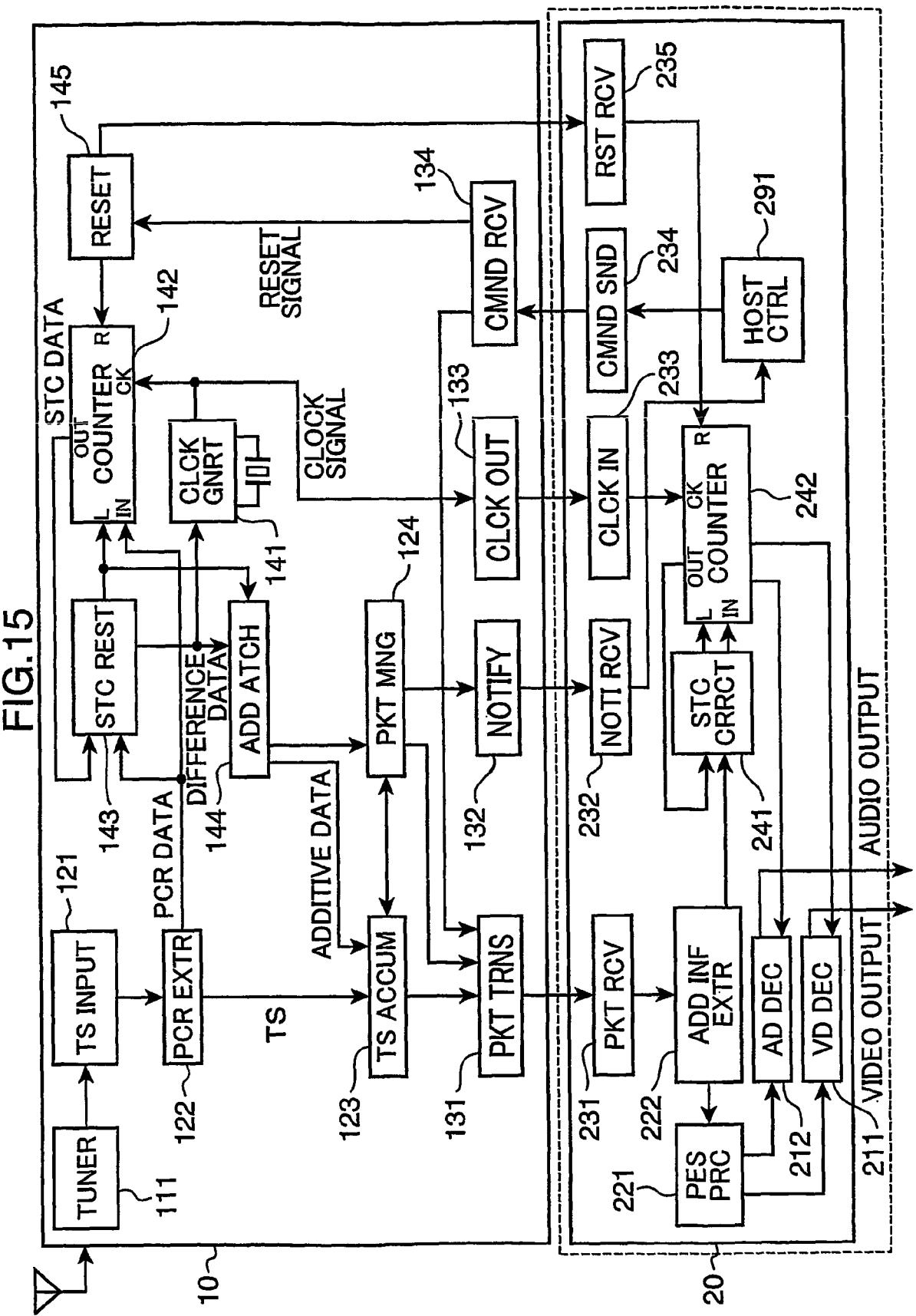
FIG. 15 is a block diagram showing still another example of the functioning blocks constituting the semiconductor integrated circuit used in the present invention.

Similarly to FIG. 12, elements which are recommended to constitute a semiconductor integrated circuit are enclosed by the rectangular dotted-line block in FIG. 13 (FIG. 14, FIG. 15).

Specifically, as a further altered arrangement, referring to FIG. 13, a semiconductor Integrated circuit may be constituted of elements corresponding to core parts (counter correction block) enclosed by the rectangular dotted-line block in FIG. 11, and a host controlling unit 291, a packet receiving unit 231, a notification receiving unit 232, a clock inputting unit 233, and a command sending unit 234. In other words, the core parts, the control block, and an interface block serving as an interface to the receiver 10, constitute the semiconductor integrated circuit. This arrangement eliminates providing an additional interface on the outside of the semiconductor integrated circuit.

As yet another arrangement, referring to FIG. 14, a semiconductor integrated circuit may be constituted of elements corresponding to the elements enclosed by the rectangular dotted-line block in FIG. 13, and a reset receiving unit 235.

As still another arrangement, referring to FIG. 15, a semiconductor integrated circuit may be constituted of elements corresponding to the elements enclosed by the rectangular dotted-line block in FIG. 14, and a PES processing unit 221, a video decoder 211, and an audio decoder 212. In other words, core parts, a control block, an interface block, and a decoder block constitute the semiconductor integrated circuit in FIG. 15. This arrangement eliminates providing an additional decoder on the outside of the semiconductor integrated circuit.

As mentioned above, incorporating several elements (functioning parts) into a functioning block, and fabricating the functioning block or blocks into a single semiconductor integrated circuit enables to reduce the size of the blocks, and to attain high-speed processing. Further, as compared with a case of constituting the respective elements (functioning parts) of individual semiconductor integrated circuits, there is no or less connection failure, and adjustment between the elements is not necessary. Therefore, use of the semiconductor integrated circuit as constructed above makes it possible to provide the host device with a stabilized operation and clock synchronizing function of the present invention.

Further, it may be possible to make a passive circuit by excluding the control block constituted of the host controlling unit 291 from the functioning block constituting a semiconductor integrated circuit as shown in FIGS. 13, 14, and 15.

The elements or functioning parts to be incorporated into a semiconductor integrated circuit are merely some of the examples. An arrangement incorporated with functioning parts other than the above functioning parts, or excluding some of the above functioning parts may be applicable. Further alternatively, in the similar manner as in the host device, some of the elements (functioning parts) constituting the receiver in the present invention may be incorporated into a single semiconductor integrated circuit.

As mentioned above, according to the digital broadcasting receiving system of the present invention, if abnormality such as a poor radio wave receiving condition takes place, first, the extracted PCR data is set in the R_STC counter 142, which is a recipient STC counter. The variation information data including the PCR data is transferred to the host device 20. The STC correcting unit 241 corrects the counter value in the H_STC counter 242, which is a host STC counter, so that the counter value in the H_STC counter 242 is coincident with the counter value in the R_STC counter 142. Thereby, in the digital broadcasting receiving system of the present invention, clock synchronization can be restored (resumed) at a high speed while decoding video and audio data with high precision.

Specifically, in the digital broadcasting receiving system of the present invention, the host device 20 is constructed such that respective digital processing is carried out with use of the clock signal that has been resynchronized in the receiver 10, whereby the same clock signal is commonly used in the receiver 10 and the host device 20. This arrangement eliminates clock regeneration in the host device 20, and makes it possible to promptly use the clock signal that has been resynchronized in the receiver 10. Further, since there is no need of providing a clock generating unit in the host device 20, this arrangement contributes to reduction in the number of parts, lowering of power consumption, and downsizing of the host device 20. Thus, the present invention is advantageous in establishing the digital broadcasting receiving system in which a portable member such as a movable object is used.

Figure 16:
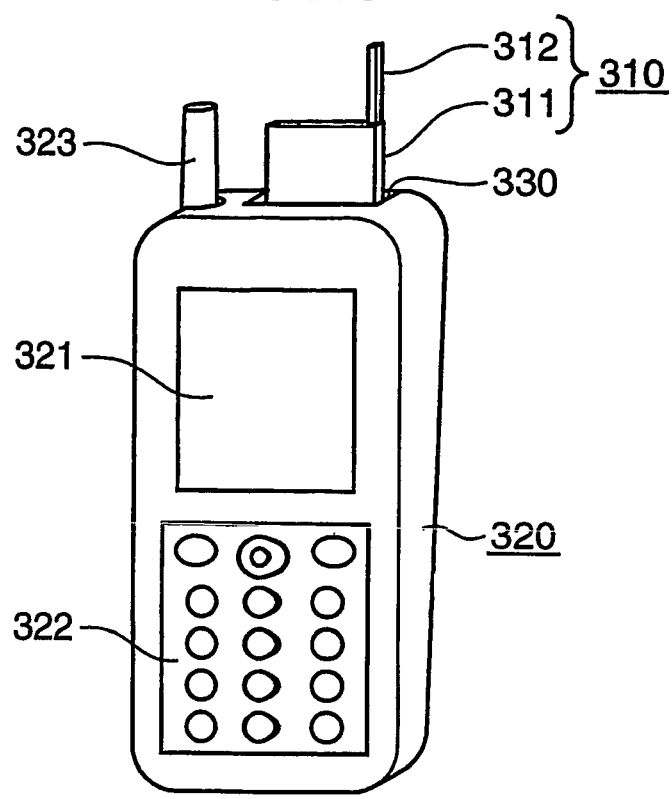
FIG. 16 is an illustration showing the digital broadcasting receiving system embodying the present invention.
Figure 17:
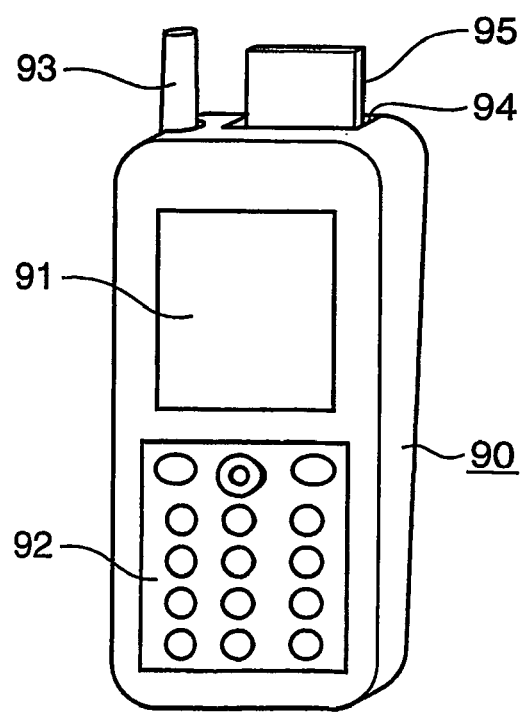
FIG. 17 is an illustration showing a conventional device in which a special memory card is used with a mobile phone.

FIG. 16 is an illustration embodying the digital broadcasting receiving system in which a receiver 10 (a special memory card) which is detachably attachable to a host device 20 (movable object) is used. Referring to FIG. 16, a special memory card 310 corresponding to the receiver 10 is inserted in a memory card mounting portion 330 of a mobile phone functioning as the host device 20 via an interface to the special memory card 310.

Referring to FIG. 16, the host device 20 is constituted of a phone body 320, a key entering portion 322 with which a user performs input operations such as entering of telephone numbers and designation of operations, a display portion 321 for displaying information relating to communication or the like, an antenna 323 for transmitting/receiving data, and various processing circuits (not shown) provided inside the phone body 320. The processing circuits have the various functions of the host device 20 as described with reference to FIG. 2.

The mounting portion 330 for receiving the special memory card 310 having a function of receiving digital broadcasting is formed in the upper part of the phone body 320. The special memory card 310 has a card body 311 having the function of the receiver 10 as described with reference to FIG. 2, and an antenna 312 for transmitting/receiving the digital broadcasting. Specifically, the special memory card 310 is an electronic card having a function of decoding the received digital broadcasting wave and sending the decoded signal as a stream signal in the form of a certain number of packets.

The mounting portion 330 is adapted to implement signal or data connection as represented by the digital interface 30 (see FIG. 1). Specifically, the receiver 10 and the host device 20 are interconnected with each other by the digital interface 30 which interconnects the I/F section 13 of the receiver 10 and the I/F section 23 of the host device 20. The receiver 10 and the host device 20 are interconnected with each other by the digital interface 30 such that the receiver 10 is allowed to send, to the host device 20, the transport stream signal decoded in the TS receiving section 12, the clock signal generated in the clock generating unit 141, and the variation information data stored in the additive information attaching unit 144 serving as the variation processor.

The electronic card as represented by the special memory card 310 may be an SD card having a function of decoding the received digital broadcasting wave and sending the decoded signal as a stream signal in the form of a certain number of packets. The stream signal, clock signal, and variation information data to be sent from the SD card may be transmitted through a data line defined in compliance with the specifications of the SD card, or through a data line and a command line.

Utilizing the data line defined in compliance with the SD card specifications is advantageous in effectively utilizing the sophisticated copyright protecting function, and the high-speed information communicating function inherent to the SD card.

With the above arrangement, when a user, for example, inserts the special memory card 310 having the function of the receiver 10 in the mounting portion 330, the user is allowed to use the phone body 320 in a manner of combining the function of the mobile phone with the function of the receiver 10. In other words, programs of the digital broadcasting which have been received in the special memory card 310 are displayable on the display portion 321 by inserting the special memory card 310 having the function of the receiver 10 in the mounting portion 330 of the phone body 320.

In this way, when the user of the host device 20 wishes to watch the digital broadcasting, the user can watch the digital broadcasting by attaching the digital-broadcasting-receivable special memory card 310 in the mounting portion 330 of the phone body 320. On the other hand, when the user does not wish to watch the digital broadcasting, the user can use the phone body 320 as an ordinary mobile phone by detaching the special memory card 310 from the mounting portion 330. Alternatively, the phone body 320 may be usable as an ordinary mobile phone with the special memory card 310 being inserted in the mounting portion 330 of the phone body 320. It is needless to say that a memory card such as a generally-available SD card may be mountable, in place of the special memory card 310, so that the phone body 320 is usable in a manner of combining the function of the mobile phone and the function of the memory card.

Referring to FIG. 16, described is the case where the host device is a mobile phone. Alternatively, the host device may be a movable object other than the mobile phone, such as a PDA, a digital camera, or a navigation system. Further alternatively, the present invention is applicable to a non-movable object such as a set-top box.

[Modifications and Alterations]

In the first and second embodiments, the system is configured such that the host controlling unit 291 detects switching over of the channel in response to designation of the user or the like, and performs reset processing for initialization. The present invention is not limited to the above. The system may be configured such that a signal indicative of variation detection in the receiver 10 may be transmitted to the host controlling unit 291 of the host device 20 via a transmission line other than the transmission line for transmitting the transport stream.

In the above altered arrangement, if abnormality such as synchronization failure is detected by the STC recovering unit 143, the STC recovering unit 143 notifies the additive information attaching unit 144 of a variation detection signal. Then, the additive information attaching unit 144 notifies the notification unit 132 via the packet managing unit 124 of a detection result as to whether the additive information attaching unit 144 received the variation detection signal. In response to receiving the notification, the notification unit 132 as the recipient interface sends the notification to the notification receiving unit 232 as the host interface. The notification receiving unit 232, then, transfers the notification to the host controlling unit 291.

The host controlling unit 291, then, analyzes the detection result as to whether the variation detection signal has been detected, and issues a reset command to the command sending unit 234 if it is judged that the variation detection signal has been detected. Thereby, the command sending unit 234 sends command data, i.e., the reset command, to the command receiving unit 134. The command receiving unit 134, then, analyzes the received command data, and notifies the reset processing unit 145 of a reset signal if it is judged that the command data includes the reset command. In response to receiving the notification, the reset processing unit 145 resets the R_STC counter 142.

Subsequently, the reset processing unit 145 notifies the reset receiving unit 235 of the resetting of the R_STC counter 142. The notification may be sent through a reset signal line from the receiver 10 to the host device 20, for example. In response to receiving the notification that the R_STC counter 142 has been reset, the reset receiving unit 235 executes resetting of the H_STC counter 242. Thereby, the counter values in the R_STC counter 142 of the receiver 10 and the H_STC counter 242 of the host device 20 are substantially simultaneously set to an initial value such as zero.

In the foregoing embodiments, described is the case where the receiver 10 sends, to the host device 20, the transport stream signal that has been decoded in the receiver 10 with the additive information being attached thereto. The present invention is not limited to the above. A stream signal in PES format or section format that has been regenerated based on the decoded transport stream signal may be transmitted along with the additive information.

In the foregoing embodiments, described is the case where the present invention is applied to the MPEG2 system in the digital broadcasting. The present invention is not limited to the above, and is applicable to a general digital communication system including a system for distributing and receiving digital contents via a network.

BRIEF DESCRIPTION ON THE EMBODIMENTS

The following is a brief description on the embodiments of the present invention.

(1) A digital signal receiving system comprises: a digital signal receiving device which receives a digital communication signal, has a function of generating a clock signal based on PCR data included in the communication signal, and a function of transmitting a stream signal in the form of a plurality of packets, as well as the clock signal, the stream signal including the communication signal; and a host device which receives the stream signal and the clock signal from the digital signal receiving device via an interface section, the digital signal receiving device including: a recipient STC counter which counts the number of clocks of the clock signal and outputs the counter value as recipient STC data; a variation detector which calculates a difference between the recipient STC data and the PCR data as difference data, and detects a variation in frequency of the clock signal that exceeds a predetermined value based on the difference data; and a variation processor which sends, to the host device, variation information data obtained based on the recipient STC data and the PCR data, and sets the PCR data in the recipient STC counter if the variation detector detects the variation in frequency that exceeds the predetermined value, and the host device including: a host STC counter which counts the number of clocks of the clock signal sent from the digital signal receiving device, and outputs the counter value as host STC data; and an STC correcting unit which calculates correction data based on the host STC data and the variation information data if the variation detector detects the variation in frequency that exceeds the predetermined value, and sets the correction data in the host STC counter so as to coincide the counter value set in the recipient STC counter with the counter value set in the host STC counter.

In the above arrangement, the digital signal receiving device sets the extracted PCR data in the recipient STC counter if abnormality such as a poor radio wave receiving condition takes place. After the setting of the PCR data in the recipient STC counter, the recipient STC counter keeps on counting from the value of the PCR data, and the digital signal receiving device transfers, to the host device, the variation information data obtained based on the recipient STC data and the PCR data. The host STC counter keeps on counting the number of clocks of the clock signal sent from the digital signal receiving device while the digital signal receiving device carries out the above operation. Accordingly, the difference in the counter value between the recipient STC counter and the host STC counter is made constant irrespective of a lapse of time. In other words, the difference in the counter value does not depend on the transfer time of the variation information data which is sent from the digital signal receiving device to the host device.

The STC correcting unit corrects the counter value in the host STC counter with use of the variation information data, so that the counter value set in the host STC counter coincides with the counter value set in the recipient STC counter. Thereby, clock resynchronization is secured between the digital signal receiving device and the host device.

Further, since the same clock signal is used in the digital signal receiving device and the host device, there is no need of providing a clock generating function in the host device, which contributes to lower power consumption and downsizing of the digital signal receiving system.

(2) A digital signal receiving system is the digital signal receiving system (1), wherein the variation information data is a value that has been accumulated since the variation has been detected for the first time, the digital signal receiving device further includes a counter section which counts the number of times of variation detection from the first time of variation detection, and the host device further includes a judging unit which accumulatively stores the number of times of variation detection sent from the digital signal receiving device one after another, compares the stored number of times of variation detection with the number of times of variation detection which has sent from the digital signal receiving device most lately, and sets the variation information data as the correction data if the stored number of times of variation detection and the latest number of times of variation detection are not serial integers.

In the above arrangement, the digital signal receiving device sets the extracted PCR data in the recipient STC counter if abnormality such as a poor radio wave receiving condition takes place. After the setting of the PCR data in the recipient STC counter, the recipient STC counter keeps on counting from the value of the PCR data, and the digital signal receiving device transfers, to the host device, the variation information data obtained based on the recipient STC data and the PCR data. The variation information data is a value that has been accumulated since the variation has been detected for the first time. The host STC counter keeps on counting the number of clocks of the clock signal sent from the digital signal receiving device while the digital signal receiving device carries out the above operation.

With the above arrangement, even if the difference data is not properly transmitted to the host device due to a problem related to a transmission line for transmitting the stream signal carrying the difference data, the STC correcting unit can correct the counter value in the host STC counter with use of the variation information data, so that the counter value set in the host STC counter coincides with the counter value set in the recipient STC counter, because the variation information data is the value that has been accumulated since the variation has been detected for the first time. Thus, this arrangement makes it possible to securely resynchronize the clocks in the digital signal receiving device and the host device.

(3) A digital signal receiving system is the digital signal receiving system (1) or (2), wherein the STC correcting unit calculates a difference between the PCR data and the recipient STC data, performs a predetermined calculation based on the difference and the host STC data, and sets the calculation result in the host STC counter as the correction data, the PCR data and the recipient STC data being supplied as the variation information data.

In the above arrangement, the receiving device supplies, to the host device, the PCR data, which is clock information relating to the sender of the digital signal, and the STC data, which is clock information relating to the receiving device, independently of each other, as the variation information data. The STC correcting unit of the host device calculates the difference between the PCR data and the recipient STC data, generates correction data for synchronizing the clocks in the receiving device and the host device based on the difference, and sets the correction data in the host STC counter. Thereby, the counter value in the host STC counter and the counter value in the recipient STC counter can be coincident with each other. Further, since the STC correcting unit performs the calculation necessary for the clock synchronization, this arrangement makes it easy to alter or expand the function.

(4) A digital signal receiving system is the digital signal receiving system (3), wherein the STC correcting unit calculates a difference by subtracting the recipient STC data from the PCR data, performs the calculation by adding the difference to the host STC data, and sets the calculation result in the host STC counter as the correction data, the PCR data and the recipient STC data being supplied as the variation information data.

In the above arrangement, the receiving device supplies, to the host device, the PCR data as the clock information relating to the sender of the digital signal, and the recipient STC data as the clock information relating to the receiving device, independently of each other, as the variation information data. The STC correcting unit of the host device calculates the difference by subtracting the recipient STC data from the PCR data, and adds the difference to the host STC data. Since the value of the STC data is commonly used in the receiving device and the host device, this arrangement makes it possible to set, in the host STC counter, the same counter value as in the recipient STC counter.

(5) A digital signal receiving system is the digital signal receiving system (1) or (2), wherein the STC correcting unit obtains a difference between the PCR data and the recipient STC data, performs a predetermined calculation based on the difference and the host STC data, and sets the calculation result in the host STC counter as the correction data, the difference between the PCR data and the recipient STC data being supplied as the variation information data.

In the above arrangement, the receiving device calculates the difference between the PCR data as the clock information relating to the sender of the digital signal, and the recipient STC data as the clock information relating to the receiving device, and supplies the difference to the host device as the variation information data. This arrangement contributes to reduction in the quantity of the variation information data. The STC correcting unit performs the predetermined calculation based on the difference and the host STC data, generates correction data for synchronizing the clocks in the receiving device and the host device, and sets the correction data in the host STC counter. This arrangement makes it possible to set, in the host STC counter, the same counter value as in the recipient STC counter.

(6) A digital signal receiving system is the digital signal receiving system (5), wherein the STC correcting unit obtains a difference by subtracting the recipient STC data from the PCR data, performs the calculation by adding the difference to the host STC data, and sets the calculation result in the host STC counter as the correction data, the difference by subtracting the recipient STC data from the PCR data being supplied as the variation information data.

In the above arrangement, the receiving device calculates the difference by subtracting the recipient STC data as the clock information relating to the receiving device from the PCR data as the clock information relating to the sender of the digital signal, and supplies the difference as the variation information data to the host device. This arrangement contributes to reduction in the quantity of the variation information data. The STC correcting unit adds the difference as the variation information data to the host STC data. Since the value of the STC data is commonly used in the receiving device and the host device, this arrangement makes it possible to set, in the host STC counter, the same counter value as in the recipient STC counter.

(7) A digital signal receiving system is any one of the digital signal receiving systems (3) through (6), wherein the variation information data is transmitted from the digital signal receiving device to the host device via the interface section while being attached to the stream signal.

In the above arrangement, there is no need of providing an additional transmission line for transmitting the variation information data from the receiving device to the host device. Further, the communication signal and the variation information data are included in the single stream signal, correlation between the communication signal and the variation information data is secured, as compared with the case where the communication signal and the variation information data are sent separately. This arrangement enables to accurately playback the video and audio data based on the decoded stream signal, for instance.

(8) A digital signal receiving system is the digital signal receiving system (7), wherein the variation detector detects the variation in frequency of the clock signal based on the difference data.

The above arrangement enables to utilize a circuit employed in the ordinary MPEG2 system which is designed to synchronize the clocks based on a difference between the PCR data as the clock information relating to the sender of the digital signal, and the STC data as the clock information relating to the receiving device, which contributes to simplification of the circuit configuration.

(9) A digital signal receiving system is the digital signal receiving system (8), wherein the variation detector outputs a variation detection signal indicative of the detection of the variation in frequency of the clock signal if the difference data is out of a range defined by a predetermined lower limit and a predetermined upper limit.

In the above arrangement, since the lower limit and the upper limit can be optionally set, the variation can be detected efficiently by properly setting the allowable range. Further, the above arrangement makes it easy to determine where the value of the difference data is within the allowable range. This contributes to simplification of the circuit configuration.

(10) A digital signal receiving system is the digital signal receiving system (9), wherein the digital signal receiving device further includes an additive information attaching unit which sets a flag indicating whether the variation information data is valid, and attaches additive information including the flag and the variation information data to the stream signal.

In the above arrangement, the additive information attaching unit is configured such that information as to whether the additive information is valid can be included in the stream signal, based on the variation information, not to mention attaching the additive information to the stream signal. This arrangement clarifies the criteria as to the validity of the additive information determined by the host device, which contributes to suppression of erroneous processing.

(11) A digital signal receiving system is the digital signal receiving system (10), wherein the host device further includes an additive information extracting unit which extracts the additive information attached to the stream signal, and supplies the variation information data extracted from the additive information to the STC correcting unit, the stream signal being sent from the digital signal receiving device to the host device via the interface section.

In the above arrangement, the additive information extracting unit can isolate the communication signal in extracting the additive information from the stream signal. This arrangement makes it possible to send, to the respective functioning parts, the additive information necessary for clock synchronization, and the data necessary for communication playback independently of each other.

(12) A digital signal receiving system is the digital signal receiving system (11), wherein the digital signal receiving device further includes a command receiving unit which receives, from the host device, command data for controlling respective processing in the digital signal receiving device, and a notification unit which notifies the host device of information sent from the digital signal receiving device, and the host device further includes a command sending unit which sends, to the digital signal receiving device, the command data for controlling the respective processing in the digital signal receiving device, and a notification receiving unit which receives the information sent from the digital signal receiving device.

The above arrangement enables the host device to send, to the digital signal receiving device, the command data for controlling the respective processing in the digital signal receiving device, e.g., a reset command via the command sending unit and the command receiving unit. Further, the arrangement enables the receiving device to send, to the host device, the information, e.g., a notification that preparation of packet transfer has been completed, via the notification unit and the notification receiving unit.

(13) A digital signal receiving system is the digital signal receiving system (12), wherein the digital signal receiving device further includes a reset processing unit which resets the recipient STC counter to a predetermined initial state in response to receiving a reset signal sent from the host device via the command receiving unit, and outputs, to the host device, the reset signal indicative of the resetting, and the host device further includes a reset receiving unit which resets the host STC counter to the predetermined initial state based on the reset signal sent from the reset processing unit.

In the above arrangement, the reset processing unit sets an initial value such as zero in the recipient STC counter in response to receiving the reset signal from the host device. Subsequently, the reset processing unit sends the reset signal to the reset receiving unit, which, in turn, sets, in the host STC counter, the same value as in the recipient STC counter, i.e., the initial value such as zero. Thereby, the initial value such as zero is simultaneously set in the recipient STC counter and the host STC counter. This arrangement makes it possible to efficiently carry out clock synchronization in the respective counters after the counters are brought to their initial states.

(14) A digital signal receiving system is any one of the digital signal receiving systems (1) through (13), wherein the digital signal receiving device and the host device are interconnected with each other via a digital interface.

Since the above arrangement enables to send the stream signal from the receiving device to the host device without signal compression, and in a digital format, degradation of the signal can be suppressed.

(15) A digital signal receiving system is the digital signal receiving system (14), wherein at least the stream signal, the clock signal, and the variation information data are transmitted via the digital interface.

In the above arrangement, clock synchronization is established between the receiving device and the host device by the clock signal. If there is detected a variation in frequency of the clock signal in the receiving device, clock resynchronization is implemented based on the variation information data. Thereby, playback of the stream signal is resumed to the normal operation.

(16) A digital signal receiving system is any one of the digital signal receiving systems (1) through (15), wherein the digital signal receiving device is formed as an electronic card.

In the above arrangement, mounting the electronic card equipped with a digital signal receiving function in the host device enables the host device to receive the digital signal. Further, this arrangement makes it possible to flexibly cope with alteration of various specifications or standards and version upgrading relating to the digital communication by exchanging the electronic card without changing the host device.

(17) A digital signal receiving system is the digital signal receiving system (16), wherein the electronic card is configured as an SD card.

The above arrangement enables to establish a compact digital signal receiving system having a large capacity, improved reliability in the aspect of information protecting function, and taking advantage of the features inherent to the SD card.

(18) A digital signal receiving system is the digital signal receiving system (17), wherein at least the stream signal, the clock signal, and the variation information data are transmitted through a data line defined in compliance with the specifications of the SD card from the SD card as the digital signal receiving device.

The above arrangement enables to establish a digital signal receiving system having a sophisticated copyright protecting function and a high-speed information communicating function inherent to the SD card.

(19) A digital signal receiving device which is adapted to receive a digital communication signal, has a function of generating a clock signal based on PCR data included in the communication signal, and has a function of transmitting a stream signal in the form of a plurality of packets, as well as the clock signal, the stream signal including the communication signal, the digital signal receiving device being configured so as to establish a digital signal receiving system by being interconnected via an interface section to a host device which is adapted to receive the stream signal and the clock signal from the digital signal receiving device via the interface section, the digital signal receiving device comprises: a recipient STC counter which counts the number of clocks of the clock signal, and outputs the counter value as recipient STC data; a variation detector which calculates a difference between the recipient STC data and the PCR data as difference data, and detects a variation in frequency of the clock signal that exceeds a predetermined value based on the difference data; and a variation processor which sends, to the host device, variation information data obtained based on the recipient STC data and the PCR data, and sets the PCR data in the recipient STC counter if the variation detector detects that the variation in frequency that exceeds the predetermined value.

In the above arrangement, the digital signal receiving device is operated such that the extracted PCR data is set in the recipient STC counter if abnormality such as a poor radio wave receiving condition takes place. The digital signal receiving device transfers the variation information data to the host device. Thereby, the host device is operated such that the same counter value as in the recipient STC counter is correctively set in the host STC counter with use of the variation information data.

(20) A digital signal receiving device is the digital signal receiving device (19), wherein the variation information data includes the recipient STC data and the PCR data.

In the above arrangement, the receiving device supplies, to the host device, the PCR data as the clock information relating to the sender of the digital signal, and the STC data as the clock information relating to the receiving device, independently of each other, as the variation information data. In other words, since the calculation for clock synchronization with use of these data is implemented in the host device, the receiving device is usable with various types of host devices.

(21) A digital signal receiving device is the digital signal receiving device (19), wherein the variation information data includes a difference between the PCR data and the recipient STC data.

In the above arrangement, the receiving device calculates the difference between the PCR data as the clock information relating to the sender of the digital signal, and the recipient STC data as the clock information relating to the receiving device, and supplies the difference to the host device as the variation information data. This arrangement contributes to reduction in the quantity of the variation information data.

(22) A digital signal receiving device is the digital signal receiving device (20) or (21), wherein the variation information data is transmitted from the digital signal receiving device to the host device via the interface section while being attached to the stream signal.

In the above arrangement, there is no need of providing an additional transmission line for transmitting the variation information from the receiving device to the host device. Further, the communication signal and the variation information data are included in the single stream signal, correlation between the communication signal and the variation information data is secured, as compared with the case where the communication signal and the variation information data are sent separately. This arrangement enables to accurately playback the video and audio data based on the decoded stream signal, for instance.

(23) A digital signal receiving device is the digital signal receiving device (22), wherein the variation detector detects the variation in frequency of the clock signal based on the difference data.

The above arrangement enables to utilize a circuit employed in the ordinary MPEG2 system which is designed to synchronize the clocks based on a difference between the PCR data as the clock information relating to the sender of the digital signal, and the STC data as the clock information relating to the receiving device, which contributes to simplification of the circuit configuration.

(24) A digital signal receiving device is the digital signal receiving device (23), wherein the variation detector outputs a variation detection signal indicative of the detection of the variation in frequency of the clock signal if the difference data is out of a range defined by a predetermined lower limit and a predetermined upper limit.

In the above arrangement, since the lower limit and the upper limit can be optionally set, the variation can be detected efficiently by properly setting the allowable range. Further, the above arrangement makes it easy to determine where the value of the difference data is within the allowable range. This contributes to simplification of the circuit configuration.

(25) A digital signal receiving device is the digital signal receiving device (23), wherein the variation detector outputs a variation detection signal indicative of the detection of the variation in frequency of the clock signal if the absolute value of the difference data exceeds a predetermined upper limit.

In the above arrangement, since the upper limit is optionally settable, the variation can be detected efficiently by properly setting the upper limit. Further, since merely the absolute value of the difference data is monitored, this arrangement contributes to simplification of the circuit configuration.

(26) A digital signal receiving device is the digital signal receiving device (24) or (25), further comprising an additive information attaching unit which sets a flag indicating whether the variation information data is valid, and attaches additive information including the flag and the variation information data to the stream signal.

In the above arrangement, the additive information attaching unit is configured such that information as to whether the additive information is valid can be included in the stream signal, based on the variation information, not to mention attaching the additive information to the stream signal. This arrangement clarifies the criteria as to the validity of the additive information determined by the host device, which contributes to suppression of erroneous processing.

(27) A digital signal receiving device is the digital signal receiving device (26), further comprising a command receiving unit which receives, from the host device, command data for controlling respective processing in the digital signal receiving device, and a notification unit which notifies the host device of information sent from the digital signal receiving device.

In the above arrangement, the command receiving unit and the notification unit function as part of the recipient interface. This arrangement enables to efficiently transmit the command data from the host device to the receiving device, and transmit the information from the receiving device to the host device.

(28) A digital signal receiving device is the digital signal receiving device (27), further comprising a reset processing unit which resets the recipient STC counter to a predetermined initial state, and outputs, to the host device, the reset signal indicative of the resetting.

In the above arrangement, the receiving device is operated to output the reset signal to the host device while resetting the recipient STC counter. This arrangement enables to cause the host device to carry out the resetting of the host STC counter in synchronism with the resetting of the recipient STC counter. As a result, the initial value such as zero is synchronously settable in the recipient STC counter and the host STC counter.

(29) A digital signal receiving device is the digital signal receiving device (28), wherein the digital signal receiving device is connectable with the host device via a digital interface in such a manner that at least the stream signal, the clock signal, and the variation information data are transmitted from the digital signal receiving device to the host device via the digital interface.

In the above arrangement, since the stream signal can be transmitted from the receiving device to the host device without signal compression and in a digital format, signal degradation can be suppressed. Further, clock synchronization is established between the receiving device and the host device by the clock signal. If there is detected a variation in frequency of the clock signal in the receiving device, clock resynchronization is implemented based on the variation information data. Thereby, playback of the stream signal is resumed to the normal operation.

(30) A digital signal receiving device is any one of the digital signal receiving devices (19) through (29), wherein the digital signal receiving device is formed as an electronic card.

In the above arrangement, since the receiving device includes the electronic card equipped with a digital signal receiving function, the digital signal is receivable by mounting the electronic card in the host device. Further, this arrangement makes it possible to flexibly cope with alteration of various specifications or standards and version upgrading relating to the digital communication by exchanging the electronic card without changing the host device.

(31) A digital signal receiving device is the digital signal receiving device (30), wherein the electronic card is configured as an SD card.

The above arrangement enables to establish a compact digital signal receiving device having a large capacity, improved reliability in the aspect of information protecting function, and taking advantage of the features inherent to the SD card.

(32) A digital signal receiving device is the digital signal receiving device (31), wherein at least the stream signal, the clock signal, and the variation information data are transmitted through a data line defined in compliance with the specifications of the SD card from the digital signal receiving device.

The above arrangement enables to establish a digital signal receiving device having a sophisticated copyright protecting function and a high-speed information communicating function inherent to the SD card.

(33) A host device configured so as to establish a digital signal receiving system by being interconnected via an interface section to a digital signal receiving device which is adapted to receive a digital communication signal, has a function of generating a clock signal based on PCR data included in the communication signal, and has a function of sending a stream signal in the form of a plurality of packets, as well as the clock signal, the stream signal including the communication signal, the host device being adapted to receive the stream signal and the clock signal from the digital signal receiving device via the interface section, the host device comprising: a recipient STC counter which counts the number of clocks of the clock signal, and outputs the counter value as recipient STC data; a variation detector which calculates a difference between the recipient STC data and the PCR data as difference data, and detects a variation in frequency of the clock signal that exceeds a predetermined value based on the difference data; and a variation processor which sends, to the host device, variation information data obtained based on the recipient STC data and the PCR data, and sets the PCR data in the recipient STC counter if the variation detector detects that the variation in frequency that exceeds the predetermined value, the host device comprises: a host STC counter which counts the number of clocks of the clock signal sent from the digital signal receiving device, and outputs the counter value as host STC data; and an STC correcting unit which calculates correction data based on the host STC data and the variation information data if the variation detector detects the variation in frequency that exceeds the predetermined value, and sets the correction data in the host STC counter so as to coincide the counter value set in the recipient STC counter with the counter value set in the host STC counter.

In the above arrangement, the host device performs correction such that the counter value in the host STC counter is coincident with the counter value in the recipient STC counter with use of the variation information data sent from the digital signal receiving device. Thereby, clock resynchronization is established between the digital signal receiving device and the host device. Since the same clock signal is commonly used in the receiving device and the host device, this arrangement contributes to lowering of power consumption and downsizing of the host device.

(34) A host device is the host device (33), wherein the STC correcting unit calculates a difference between the PCR data and the recipient STC data, performs a predetermined calculation based on the difference and the host STC data, and sets the calculation result in the host STC counter as the correction data, the PCR data and the recipient STC data being supplied as the variation information data.

In the above arrangement, the host device receives the PCR data as the clock information relating to the sender of the digital signal, and the STC data as the clock information relating to the receiving device, independently of each other, as the variation information data. The STC correcting unit of the host device calculates the difference between the PCR data and the recipient STC data, generates correction data for synchronizing the clocks in the receiving device and the host device based on the difference, and sets the correction data in the host STC counter. Thereby, the counter value in the host STC counter and the counter value in the recipient STC counter can be coincident with each other. Further, since the STC correcting unit performs the calculation necessary for the clock synchronization, this arrangement makes it easy to alter or expand the function.

(35) A host device is the host device (34), wherein the STC correcting unit calculates a difference by subtracting the recipient STC data from the PCR data, performs the calculation by adding the difference to the host STC data, and sets the calculation result in the host STC counter as the correction data, the PCR data and the recipient STC data being supplied as the variation information data.

In the above arrangement, the host device receives the PCR data as the clock information relating to the sender of the digital signal, and the STC data as the clock information relating to the receiving device, independently of each other, as the variation information data. The STC correcting unit of the host device calculates the difference by subtracting the recipient STC data from the PCR data, and adds the difference to the host STC data. Since the value of the STC data is commonly used in the receiving device and the host device, this arrangement makes it possible to set, in the host STC counter, the same counter value as in the recipient STC counter.

(36) A host device is the host device (33), wherein the STC correcting unit obtains a difference between the PCR data and the recipient STC data, performs a predetermined calculation based on the difference and the host STC data, and sets the calculation result in the host STC counter as the correction data, the difference between the PCR data and the recipient STC data being supplied as the variation information data.

In the above arrangement, the host device receives the difference between the PCR data as the clock information relating to the sender of the digital signal, and the recipient STC data as the clock information relating to the receiving device, as the variation information data. This arrangement contributes to reduction in the quantity of the variation information data. The STC correcting unit performs the predetermined calculation based on the difference and the host STC data, generates correction data for synchronizing the clocks in the receiving device and the host device, and sets the correction data in the host STC counter. This arrangement makes it possible to set, in the host STC counter, the same counter value as in the recipient STC counter.

(37) A host device is the host device (36), wherein the STC correcting unit obtains a difference by subtracting the recipient STC data from the PCR data, performs the calculation by adding the difference to the host STC data, and sets the calculation result in the host STC counter as the correction data, the difference by subtracting the recipient STC data from the PCR data being supplied as the variation information data.

In the above arrangement, the host device receives the difference obtained by subtracting the recipient STC data as the clock information relating to the receiving device from the PCR data as the clock information relating to the sender of the digital signal, as the variation information data. This arrangement contributes to reduction in the quantity of the variation information data. The STC correcting unit of the host device adds the difference as the variation information data to the host STC data. Since the value of the STC data is commonly used in the receiving device and the host device, this arrangement makes it possible to set, in the host STC counter, the same counter value as in the recipient STC counter.

(38) A host device is any one of the host devices (34) through (37), wherein the variation information data is transmitted from the digital signal receiving device to the host device via the interface section while being attached to the stream signal.

In the above arrangement, there is no need of providing an additional transmission line for transmitting the variation information data from the receiving device to the host device. Further, the communication signal and the variation information data are included in the single stream signal, correlation between the communication signal and the variation information data is secured, as compared with the case where the communication signal and the variation information data are sent separately. This arrangement enables to accurately playback the video and audio data based on the decoded stream signal, for instance.

(39) A host device is the host device (38), wherein the host device is connectable with the digital signal receiving device via a digital interface in such a manner that at least the stream signal, the clock signal, and the variation information data sent from the digital signal receiving device are receivable in the host device via the digital interface.

In the above arrangement, since the stream signal can be transmitted from the receiving device to the host device without signal compression and in a digital format, signal degradation can be suppressed. Further, clock synchronization is established between the receiving device and the host device by the clock signal. If there is detected a variation in frequency of the clock signal in the receiving device, clock resynchronization is implemented based on the variation information data. Thereby, playback of the stream signal is resumed to the normal operation.

(40) A host device is the host device (39), wherein the host device is configured such that at least the stream signal, the clock signal, and the variation information data sent from the digital signal receiving device formed as an electronic card are receivable.

In the above arrangement, clock synchronization is established between the receiving device and the host device by the clock signal. If there is detected a variation in frequency of the clock signal in the receiving device, clock resynchronization is implemented based on the variation information data. Thereby, playback of the stream signal is resumed to the normal operation. Further, this arrangement makes it possible to flexibly cope with alteration of various specifications or standards and version upgrading relating to the digital communication by exchanging the electronic card without changing the host device.

(41) A host device is the host device (40), wherein the electronic card is configured as an SD card.

The above arrangement enables to provide a host device for a compact digital signal receiving system having a large capacity, improved reliability in the aspect of information protecting function, and taking advantage of the features inherent to the SD card.

(42) A host device is the host device (41), wherein the host device receives at least the stream signal, the clock signal, and the variation information data through a data line defined in compliance with the specification of the SD card.

The above arrangement enable to provide a host device for a digital signal receiving system having a sophisticated copyright protecting function and a high-speed information communicating function inherent to the SD card.

(43) A host device is the host device (42), wherein the host device includes a command sending unit which sends, to the digital signal receiving device, command data for controlling the respective processing in the digital signal receiving device, and a notification receiving unit which receives information from the digital signal receiving device.

In the above arrangement, the command sending unit and the notification receiving unit function as part of the host interface. This arrangement enables to efficiently transmit the command data from the digital signal receiving device to the host device, and transmit the information from the host device to the digital signal receiving device.

(44) A semiconductor integrated circuit for producing a host device which is adapted to receive a stream signal and a clock signal from a digital signal receiving device via an interface section in a digital signal receiving system configured such that the host device and the digital signal receiving device are interconnected with each other via the interface section, the digital signal receiving device being adapted to receive a digital communication signal, having a function of generating the clock signal based on PCR data included in the communication signal, and having a function of sending the stream signal in the form of a plurality of packets, as well as the clock signal, the semiconductor integrated circuit being adapted to produce the host device which is connectable with the digital signal receiving device comprising: a recipient STC counter which counts the number of clocks of the clock signal, and outputs the counter value as recipient STC data; a variation detector which calculates a difference between the recipient STC data and the PCR data as difference data, and detects a variation in frequency of the clock signal that exceeds a predetermined value based on the difference data; and a variation processor which sends, to the host device, variation information data obtained based on the recipient STC data and the PCR data, and sets the PCR data in the recipient STC counter if the variation detector detects that the variation in frequency that exceeds the predetermined value, the semiconductor integrated circuit comprises: a host STC counter which counts the number of clocks of the clock signal sent from the digital signal receiving device, and outputs the counter value as host STC data; and an STC correcting unit which calculates correction data based on the host STC data and the variation information data if the variation detector detects the variation in frequency that exceeds the predetermined value, and sets the correction data in the host STC counter so as to coincide the counter value set in the recipient STC counter with the counter value set in the host STC counter.

The above arrangement is advantageous in reducing the size of the host device and in attaining high-speed processing in re-synchronizing the clocks in the digital signal receiving device and the host device. Further, as compared with the case where the recipient STC counter and the STC correcting unit are provided independently of each other, there is no or less connection failure, and control between the recipient STC counter and the STC correcting unit is not required.

(45) A semiconductor integrated circuit is the semiconductor integrated circuit (44), further comprising an interface unit provided in the host device for receiving the stream signal, the clock signal, and the variation information data from the digital signal receiving device.

The above arrangement eliminates providing an additional host interface on the outside of the semiconductor integrated circuit.

(46) A semiconductor integrated circuit is the semiconductor integrated circuit (44) or (45), further comprising a decoder for decoding the stream signal and outputting the decoded signal.

The above arrangement eliminates providing an additional decoder on the outside of the semiconductor integrated circuit.

(47) A semiconductor integrated circuit is any one of the semiconductor integrated circuits (44) through (46), further comprising a controlling unit which controls respective units in the host device, and generates and outputs command information indicative of commands to respective units in the digital signal receiving device.

In the above arrangement, the semiconductor integrated circuit has an active function of sending various command information.

Although the present invention has been described in detail, the aforementioned description is merely an example in every aspect of the present invention, and the present invention is not limited thereto. It is to be construed that unillustrated numerous modifications and alterations will be embraced in the present invention, unless otherwise such modifications and alterations depart from the scope of the present invention.

EXPLOITATION IN INDUSTRY

The digital signal receiving system, the digital signal receiving device, the host device, and the semiconductor integrated circuit of the present invention are industrially useful because the clocks in the receiving device and the host device can be resynchronized even if abnormality such as a poor radio wave receiving condition takes place, and lowering of power consumption and downsizing of the digital signal receiving system, the receiving device, the host device, and the semiconductor integrated circuit can be realized.

The invention claimed is:

1. A digital signal receiving system comprising:
a digital signal receiving device which receives a digital communication signal, has a function of generating a clock signal based on PCR data included in the communication signal, and a function of transmitting a stream signal in the form of a plurality of packets, as well as the clock signal, the stream signal including the communication signal; and
a host device which receives the stream signal and the clock signal from the digital signal receiving device via an interface section,
the digital signal receiving device including:
a recipient STC counter which counts the number of clocks of the clock signal and outputs the counter value as recipient STC data;
a variation detector which calculates a difference between the recipient STC data and the PCR data as difference data, and detects a variation in frequency of the clock signal that exceeds a predetermined value based on the difference data; and
a variation processor which sends, to the host device, variation information data obtained based on the recipient STC data and the PCR data, and sets the PCR data in the recipient STC counter if the variation detector detects the variation in frequency that exceeds the predetermined value, and
the host device including:
a host STC counter which counts the number of clocks of the clock signal sent from the digital signal receiving device, and outputs the counter value as host STC data; and
an STC correcting unit which calculates correction data based on the host STC data and the variation information data if the variation detector detects the variation in frequency that exceeds the predetermined value, and sets the correction data in the host STC counter so as to coincide the counter value set in the recipient STC counter with the counter value set in the host STC counter.

2. The digital signal receiving system according to claim 1, wherein the variation information data is transmitted from the digital signal receiving device to the host device via the interface section while being attached to the stream signal.

3. The digital signal receiving system according to claim 2, wherein the variation detector detects the variation in frequency of the clock signal based on the difference data.

4. The digital signal receiving system according to claim 3, wherein the variation detector outputs a variation detection signal indicative of the detection of the variation in frequency of the clock signal if the difference data is out of a range defined by a predetermined lower limit and a predetermined upper limit.

5. The digital signal receiving system according to claim 4, wherein the digital signal receiving device further includes an additive information attaching unit which sets a flag indicating whether the variation information data is valid, and attaches additive information including the flag and the variation information data to the stream signal.

6. The digital signal receiving system according to claim 5, wherein the host device further includes an additive information extracting unit which extracts the additive information attached to the stream signal, and supplies the variation information data extracted from the additive information to the STC correcting unit, the stream signal being sent from the digital signal receiving device to the host device via the interface section.

7. The digital signal receiving system according to claim 6, wherein the digital signal receiving device further includes a command receiving unit which receives, from the host device, command data for controlling respective processing in the digital signal receiving device, and a notification unit which notifies the host device of information sent from the digital signal receiving device, and the host device further includes a command sending unit which sends, to the digital signal receiving device, the command data for controlling the respective processing in the digital signal receiving device, and a notification receiving unit which receives the information sent from the digital signal receiving device.

8. The digital signal receiving system according to claim 7, wherein the digital signal receiving device further includes a reset processing unit which resets the recipient STC counter to a predetermined initial state in response to receiving a reset signal sent from the host device via the command receiving unit, and outputs, to the host device, the reset signal indicative of the resetting, and the host device further includes a reset receiving unit which resets the host STC counter to the predetermined initial state based on the reset signal sent from the reset processing unit.

9. The digital signal receiving system according to claim 8, wherein the STC correcting unit calculates a difference between the PCR data and the recipient STC data, performs a predetermined calculation based on the difference and the host STC data, and sets the calculation result in the host STC counter as the correction data, the PCR data and the recipient STC data being supplied as the variation information data.

10. The digital signal receiving system according to claim 9, wherein the STC correcting unit calculates a difference by subtracting the recipient STC data from the PCR data, performs the calculation by adding the difference to the host STC data, and sets the calculation result in the host STC counter as the correction data, the PCR data and the recipient STC data being supplied as the variation information data.

11. The digital signal receiving system according to claim 8, wherein the STC correcting unit obtains a difference between the PCR data and the recipient STC data, performs a predetermined calculation based on the difference and the host STC data, and sets the calculation result in the host STC counter as the correction data, the difference between the PCR data and the recipient STC data being supplied as the variation information data.

12. The digital signal receiving system according to claim 11, wherein the STC correcting unit obtains a difference by subtracting the recipient STC data from the PCR data, performs the calculation by adding the difference to the host STC data, and sets the calculation result in the host STC counter as the correction data, the difference by subtracting the recipient STC data from the PCR data being supplied as the variation information data.

13. The digital signal receiving system according to claim 1, wherein the digital signal receiving device and the host device are interconnected with each other via a digital interface and at least the stream signal, the clock signal, and the variation information data are transmitted via the digital interface.

14. The digital signal receiving system according to claim 1, wherein the digital signal receiving device is formed as an electronic card.

15. A digital signal receiving device which is adapted to receive a digital communication signal, has a function of generating a clock signal based on PCR data included in the communication signal, and has a function of transmitting a stream signal in the form of a plurality of packets, as well as the clock signal, the stream signal including the communication signal, the digital signal receiving device being configured so as to establish a digital signal receiving system by being interconnected via an interface section to a host device which is adapted to receive the stream signal and the clock signal from the digital signal receiving device via the interface section, the digital signal receiving device comprising: a recipient STC counter which counts the number of clocks of the clock signal, and outputs the counter value as recipient STC data; a variation detector which calculates a difference between the recipient STC data and the PCR data as difference data, and detects a variation in frequency of the clock signal that exceeds a predetermined value based on the difference data; and a variation processor which sends, to the host device, variation information data obtained based on the recipient STC data and the PCR data, and sets the PCR data in the recipient STC counter if the variation detector detects that the variation in frequency that exceeds the predetermined value, and the host device including: a host STC counter which counts the number of clocks of the clock signal sent from the digital signal receiving device, and outputs the counter value as host STC data and an STC correcting unit which calculates correction data based on the host STC data and the variation information data if the variation detector detects the variation in frequency that exceeds the predetermined value, and sets the correction data in the host STC counter so as to coincide the counter value set in the recipient STC counter with the counter value set in the host STC counter.

16. The digital signal receiving device according to claim 15, wherein the variation information data is transmitted from the digital signal receiving device to the host device via the interface section while being attached to the stream signal.

17. The digital signal receiving device according to claim 16, wherein the variation detector detects the variation in frequency of the clock signal based on the difference data.

18. The digital signal receiving device according to claim 17, further comprising an additive information attaching unit which sets a flag indicating whether the variation information data is valid, and attaches additive information including the flag and the variation information data to the stream signal.

19. The digital signal receiving device according to claim 18, further comprising a command receiving unit which receives, from the host device, command data for controlling respective processing in the digital signal receiving device, and a notification unit which notifies the host device of information sent from the digital signal receiving device.

20. The digital signal receiving device according to claim 19, further comprising a reset processing unit which resets the recipient STC counter to a predetermined initial state, and outputs, to the host device, the reset signal indicative of the resetting.

21. The digital signal receiving device according to claim 20, wherein the digital signal receiving device is connectable with the host device via a digital interface in such a manner that at least the stream signal, the clock signal, and the variation information data are transmitted from the digital signal receiving device to the host device via the digital interface.

22. The digital signal receiving device according to claim 21, wherein the variation information data includes the recipient STC data and the PCR data.

23. The digital signal receiving device according to claim 21, wherein the variation information data includes a difference between the PCR data and the recipient STC data.

24. The digital signal receiving device according to claim 15, wherein the digital signal receiving device is formed as an electronic card.

25. The digital signal receiving device according to claim 17, wherein the variation detector outputs a variation detection signal indicative of the detection of the variation in frequency of the clock signal if the difference data is out of a range defined by a predetermined lower limit and a predetermined upper limit.

26. The digital signal receiving device according to claim 17, wherein the variation detector outputs a variation detection signal indicative of the detection of the variation in frequency of the clock signal if the absolute value of the difference data exceeds a predetermined upper limit.

27. A host device configured so as to establish a digital signal receiving system by being interconnected via an interface section to a digital signal receiving device which is adapted to receive a digital communication signal, has a function of generating a clock signal based on PCR data included in the communication signal, and has a function of sending a stream signal in the form of a plurality of packets, as well as the clock signal, the stream signal including the communication signal, the host device being adapted to receive the stream signal and the clock signal from the digital signal receiving device via the interface section, the host device comprising: a recipient STC counter which counts the number of clocks of the clock signal, and outputs the counter value as recipient STC data; a variation detector which calculates a difference between the recipient STC data and the PCR data as difference data, and detects a variation in frequency of the clock signal that exceeds a predetermined value based on the difference data; and a variation processor which sends, to the host device, variation information data obtained based on the recipient STC data and the PCR data, and sets the PCR data in the recipient STC counter if the variation detector detects that the variation in frequency that exceeds the predetermined value, the host device comprising:

a host STC counter which counts the number of clocks of the clock signal sent from the digital signal receiving device, and outputs the counter value as host STC data; and an STC correcting unit which calculates correction data based on the host STC data and the variation information data if the variation detector detects the variation in frequency that exceeds the predetermined value, and sets the correction data in the host STC counter so as to coincide the counter value set in the recipient STC counter with the counter value set in the host STC counter.

28. The host device according to claim 27, wherein the variation information data is transmitted from the digital signal receiving device to the host device via the interface section while being attached to the stream signal.

29. The host device according to claim 27, wherein the host device includes a command sending unit which sends, to the digital signal receiving device, command data for controlling the respective processing in the digital signal receiving device, and a notification receiving unit which receives information from the digital signal receiving device.

30. The host device according to claim 27, wherein the STC correcting unit calculates a difference between the PCR data and the recipient STC data, performs a predetermined calculation based on the difference and the host STC data, and sets the calculation result in the host STC counter as the correction data, the PCR data and the recipient STC data being supplied as the variation information data.

31. The host device according to claim 30, wherein the STC correcting unit calculates a difference by subtracting the recipient STC data from the PCR data, performs the calculation by adding the difference to the host STC data, and sets the calculation result in the host STC counter as the correction data, the PCR data and the recipient STC data being supplied as the variation information data.

32. The host device according to claim 27, wherein the STC correcting unit obtains a difference between the PCR data and the recipient STC data, performs a predetermined calculation based on the difference and the host STC data, and sets the calculation result in the host STC counter as the correction data, the difference between the PCR data and the recipient STC data being supplied as the variation information data.

33. The host device according to claim 32, wherein the STC correcting unit obtains a difference by subtracting the recipient STC data from the PCR data, performs the calculation by adding the difference to the host STC data, and sets the calculation result in the host STC counter as the correction data, the difference by subtracting the recipient STC data from the PCR data being supplied as the variation information data.

34. The host device according to claim 27, wherein the host device is connectable with the digital signal receiving device via a digital interface in such a manner that at least the stream signal, the clock signal, and the variation information data sent from the digital signal receiving device are receivable in the host device via the digital interface.

35. The host device according to claim 34, wherein the host device is configured such that at least the stream signal, the clock signal, and the variation information data sent from the digital signal receiving device formed as an electronic card are receivable.

* * * * *